US005645708A

United States Patent [19]
Jones

[11] Patent Number: 5,645,708
[45] Date of Patent: *Jul. 8, 1997

[54] CHLORIDE ASSISTED HYDROMETALLURGICAL COPPER EXTRACTION

[75] Inventor: David L. Jones, Delta, Canada

[73] Assignee: Cominco Engineering Services Ltd., Vancouver, Canada

[ * ] Notice: The term of this patent shall not extend beyond the expiration date of Pat. No. 5,431,788.

[21] Appl. No.: 425,117

[22] Filed: Apr. 21, 1995

Related U.S. Application Data

[63] Continuation-in-part of Ser. No. 98,874, Jul. 29, 1993, Pat. No. 5,431,788.

[30] Foreign Application Priority Data

Dec. 20, 1994 [WO] WIPO .................. PCT/CA94/00696

[51] Int. Cl.$^6$ .................................................. B01D 61/44
[52] U.S. Cl. ........................ 205/580; 205/582; 205/583; 205/584
[58] Field of Search .................................. 205/580, 582, 205/583, 584

[56] References Cited

U.S. PATENT DOCUMENTS

| | | | |
|---|---|---|---|
| 4,008,076 | 2/1977 | Junghauss et al. | 75/101 R |
| 4,039,406 | 8/1977 | Stanley et al. | 204/108 |
| 4,338,168 | 7/1982 | Stanley et al. | 204/108 |
| 5,431,788 | 7/1995 | Jones | 204/104 |

OTHER PUBLICATIONS

Paper entitled "A Hydrometallurgical Conversion Process For The Treatment of Copper Concentrate", Authors: R.W. Stanley et al of the Noranda Centre, Presented At the 21st Annual CIM Conference Of Metallurgists, Toronto, Canada, Aug. 29–Sep. 1, 1982.

Primary Examiner—Arun S. Phasge
Attorney, Agent, or Firm—Elbie R. de Kock

[57] ABSTRACT

A process for the extraction of copper from a sulphide copper ore or concentrate comprises subjecting the ore or concentrate to pressure oxidation in the presence of oxygen and an acidic chloride solution to obtain a resulting pressure oxidation filtrate and an insoluble basic copper sulphate salt. The pressure oxidation is conducted in the presence of a source of bisulphate or sulphate ions, such as sulphuric acid. The amount of the sulphate source added contains at least the stoichiometric amount of sulphate ions required to produce the basic copper sulphate salt less the amount of sulphate generated in situ in the pressure oxidation. In a particular embodiment, the pressure oxidation is carried out at a predetermined $H^+/Cu$ ratio so that the pressure oxidation filtrate contains a major portion of the copper in the ore or concentrate and the basic copper salt contains a minor portion of the copper in the concentrate. The invention further provides for the selection of the $H^+/Cu$ ratio according to the grade of the ore or concentrate, the value of the ratio being selected with increasing magnitude compared with decreasing grade of the ore or concentrate. In a further embodiment, the basic copper salt is dissolved in a subsequent atmospheric leaching stage. A concentrate copper solution, which is suitable for electrowinning, is obtained by means of solvent extraction. The process also provides for the extraction of zinc and nickel from the ore.

51 Claims, 4 Drawing Sheets

CHLORIDE ASSISTED HYDROMETALLURGICAL COPPER EXTRACTION

CROSS REFERENCE TO RELATED APPLICATION

This application is a continuation-in-part of U.S. patent application Ser. No. 08/098,874 filed Jul. 29, 1993, the entire contents of which are incorporated herein by reference now U.S. Pat. No. 5,431,788.

FIELD OF THE INVENTION

This invention relates to a hydrometallurgical treatment of copper sulphide ores or concentrates in the presence of chloride ions. It also relates to the treatment of mixed ore containing zinc or nickel in addition to copper.

BACKGROUND OF THE INVENTION

Hydrometallurgical treatment of copper sulphide ores, such as chalcopyrite ($CuFeS_2$), is problematical because the severe conditions required in a pressure oxidation step for the effective leaching of copper from these ores results in oxidation of the sulphide in the ore to sulphate, resulting in the generation of large amounts of acid which requires expensive neutralization. Attempts have been made to render the sulphide concentrate leachable under relatively milder conditions under which the sulphide would only be oxidized to elemental sulphur and not all the way through to sulphate. These attempts include the pretreatment of the concentrate prior to the pressure oxidation step to render the sulphide concentrate more readily leachable, and the leaching of the concentrate in the presence of chloride ions, such as described in U.S. Pat. No. 4,039,406. In this process, the copper values in the concentrate are transformed into a solid basic copper sulphate from which the copper values must then be subsequently recovered, as described in U.S. Pat. No. 4,338,168. In the process described in U.S. Pat. No. 4,039,406 a significant amount (20–30%) of sulphide in the ore or concentrate is still oxidized to sulphate, resulting in greater oxygen demand during the pressure leach and the generation of sulphuric acid. This is particularly unfavourable for low grade concentrates, where the S/Cu ratio is high.

The present invention provides a process for the hydrometallurgical extraction of copper in which the oxidation of sulphide in the ore or concentrate to sulphate is reduced and which process is capable of treating both high grade and low grade copper ores or concentrates.

SUMMARY OF THE INVENTION

According to the invention, there is provided a process for the extraction of copper from a sulphide copper ore or concentrate, comprising the steps of subjecting the ore or concentrate to pressure oxidation in the presence of oxygen and an acidic chloride solution to obtain a resulting pressure oxidation filtrate and an insoluble basic copper sulphate salt, characterized in that the pressure oxidation is conducted in the presence of a source of bisulphate or sulphate ions which is selected from the group consisting of sulphuric acid and a metal sulphate which hydrolyzes in the acidic solution and wherein the amount of the source of bisulphate or sulphate ions which is added contains at least the stoichiometric amount of sulphate or bisulphate ions required to produce the basic copper sulphate salt less the amount of sulphate generated in situ in the pressure oxidation.

According to one particular embodiment of the invention, the process further comprises the steps of recycling the pressure oxidation filtrate to the pressure oxidation step; leaching the basic copper sulphate salt produced by the pressure oxidation in a second leaching with an acidic sulphate solution to dissolve the basic copper salt to produce a leach liquor containing copper sulphate in solution and a resulting solid residue; separating the leach liquor from the solid residue; subjecting the leach liquor to a solvent extraction process to produce copper concentrate solution and a raffinate; and recycling the raffinate to the second leaching step. In this embodiment, the pressure oxidation may be carried out at a temperature of from about 115° C. to about 175° C. The pressure oxidation may further be carried out under an oxygen partial pressure of from about 50 psig (345 kPa) to about 250 psig (1725 kPa).

The pressure oxidation is preferably carried out at a predetermined molar ratio of $H^+/Cu$, where $H^+$ represents the hydrogen ions in the acidic chloride solution and Cu represents the copper in the ore or concentrate, so that the copper concentration in the resulting pressure oxidation filtrate from the pressure oxidation is substantially equal to the copper concentration in the pressure oxidation filtrate which is recycled to the pressure oxidation step.

The chloride concentration in the pressure oxidation filtrate, which is recycled to the pressure oxidation step, is preferably maintained in the range of from about 8 g/L to about 20 g/L, preferably about 11 g/L to about 14 g/L, and more preferably at about 12 g/L.

Reference is made to the use of chloride in the specification. However, it will be appreciated that the chloride could be substituted with bromide, if desired.

The second leaching is preferably effected at a pH in the range of from about 1.3 to about 2.2. It has been found that this maximizes the solution of copper and minimizes the solution of iron. More preferably, the second leaching is effected in a pH range of from about 1.6 to about 1.9.

The second leaching may be carried out at a temperature of from about 20° C. to about 70° C., preferably, from about 35° C. to about 45° C.

For the second leaching, residence times of under one hour, such as 15 to 20 minutes, have been found to be adequate.

The raffinate may be split into a first portion comprising about two-thirds of the raffinate and a second portion comprising about one-third of the raffinate and the first portion may be recycled to the second leaching and the second portion may be subjected to a secondary solvent extraction to produce a secondary lixiviant and a secondary raffinate. The secondary lixiviant may be used as extractant in the solvent extraction of the leach liquor.

In another embodiment of the invention, the pressure oxidation is carried out at a predetermined molar ratio of $H^+/Cu$, where $H^+$ represents the hydrogen ions in the acidic chloride solution and Cu represents the copper in the ore or concentrate, so that the pressure oxidation filtrate contains a first portion of the copper in the ore or concentrate and the basic copper salt contains a second portion of the copper in the ore or concentrate and further comprising the steps of separating the pressure oxidation filtrate and the basic copper salt; leaching the basic copper salt in a second leaching step with an acidic sulphate solution to dissolve the copper salt to produce a second copper solution and a solid residue; and subjecting the pressure oxidation filtrate and the second copper solution to solvent extraction to produce concentrated copper solution for electrowinning of copper therefrom.

The process may further comprise the steps of subjecting the second copper solution and the pressure oxidation filtrate to zinc solvent extraction, prior to the solvent extraction of copper, with an organic zinc extractant to produce respective first and second zinc-loaded extractants and respective first and second zinc extraction raffinates; subjecting the first zinc extraction raffinate to solvent extraction with an organic copper extractant to produce a first copper-loaded extractant and a first copper extraction raffinate; subjecting the second zinc extraction raffinate to solvent extraction with the first copper-loaded extractant to form a second copper-loaded extractant and a second copper extraction raffinate; and stripping the zinc from the first and second zinc-loaded extractants to produce concentrated zinc solution for electrowinning.

The second zinc-loaded extractant may contain a minor loading of copper in addition to the zinc and the process may further comprise the step of treating the second zinc-loaded extractant with an aqueous zinc sulphate solution in a counter current fashion to replace the minor loading of copper in the extractant with zinc for producing a substantially uncontaminated zinc solution for electrowinning, said treatment occurring in a plurality of successive stages.

The pressure oxidation filtrate may be subjected to zinc solvent extraction with the first zinc-loaded extractant to produce the second zinc-loaded extractant, and further comprising the steps of stripping the zinc from the second zinc-loaded extractant to produce a stripped zinc extractant; and recycling the stripped zinc extractant to effect the zinc solvent extraction of the second copper solution.

The process may further comprise the steps of subjecting the first and second raffinates from the copper solvent extraction to nickel solvent extraction with an organic nickel extractant to produce respective first and second nickel-loaded extractants and respective first and second nickel extraction raffinates; and stripping nickel from the first and second nickel-loaded extractants to produce concentrated nickel solution for electrowinning.

Further according to the invention, there is provided a process for the extraction of copper from a sulphide copper ore or concentrate, comprising the steps of leaching the ore or concentrate in a first leaching step with an acidic chloride solution to produce a first copper solution and an insoluble basic copper salt; separating the first copper solution and the basic copper salt; leaching the basic copper salt in a second leaching step with an acidic sulphate solution to dissolve the copper salt to produce a second copper solution and a solid residue; and subjecting the first and second copper solutions to solvent extraction with an organic extractant to produce concentrated copper solution for electrowinning of copper therefrom.

According to a further aspect of the invention, the predetermined $H^+/Cu$ ratio is selected according to the grade of the ore or concentrate, the value of the ratio being selected with increasing magnitude compared with decreasing grade of the ore or concentrate.

According to a further embodiment of the invention, there is provided a process for the extraction of copper wherein the source of bisulphate or sulphate ions comprises a sulphuric acid solution or a copper sulphate solution which is added from an external source.

The invention also extends to copper, zinc and nickel whenever produced by the process according to the invention.

Further objects and advantages of the invention will become apparent from the description of preferred embodiments of the invention below.

DETAILED DESCRIPTION OF PREFERRED EMBODIMENTS

The process according to the invention is flexible enough to treat a range of copper concentrates in which the grade of copper varies from low, i.e. about 15% copper or less, to high grade, i.e. about 35% copper or more.

Broadly, the process comprises a pressure oxidation stage, an atmospheric leach stage, one or more solvent extraction stages and an electrowinning stage. Different grades of concentrate require different treatment in the pressure oxidation stage, requiring different modes of operation. These modes of operation are termed Mode A and Mode B, respectively. In Mode A, which is effective when high grade copper ores are leached, copper is not leached in the pressure oxidation stage. In Mode B, which is effective when medium and low grade copper ores are leached, copper is leached in the pressure oxidation stage.

Each of the two modes of operation will now be described in turn.

Process Mode A

Figure 1:
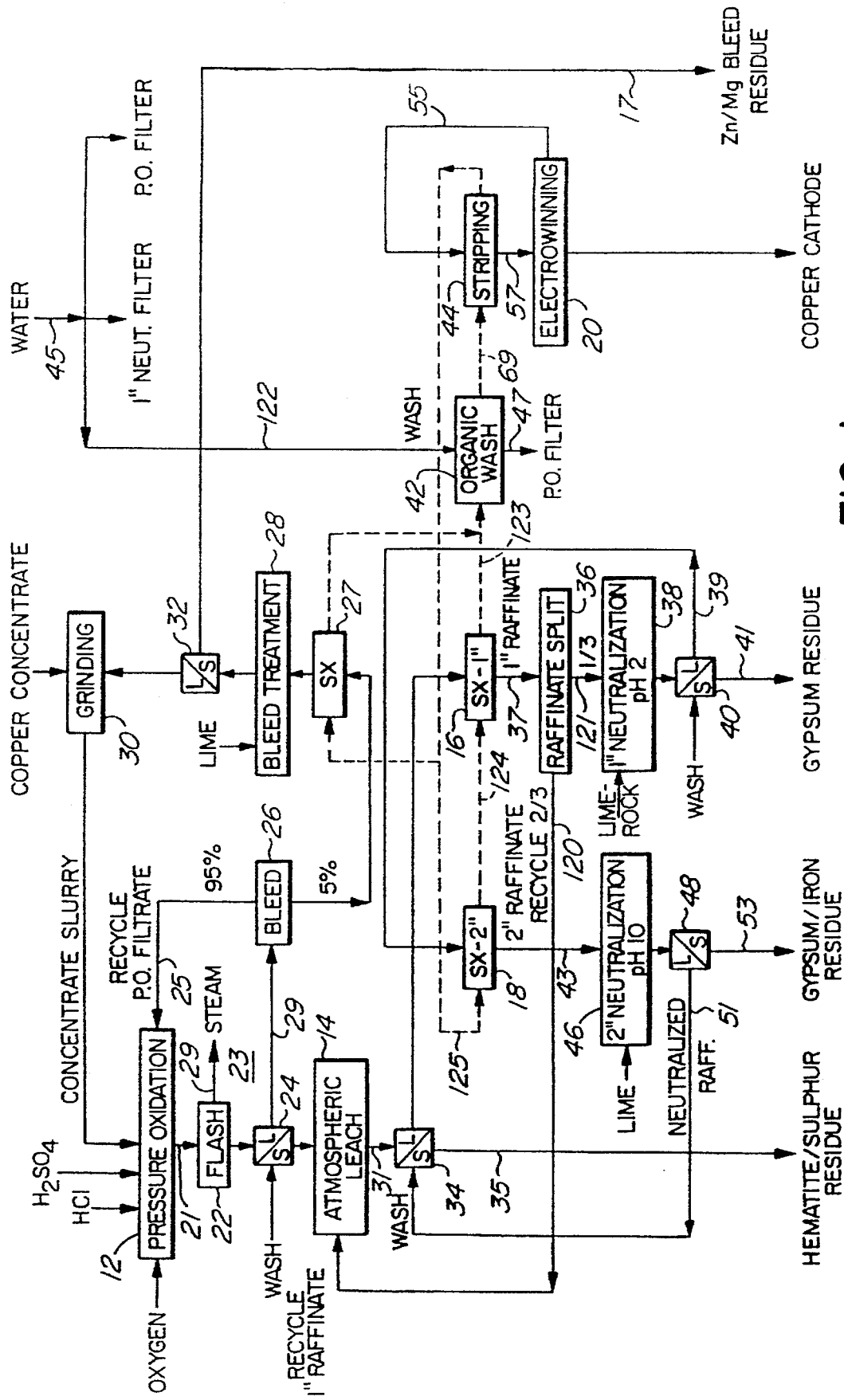
FIG. 1 is a flow diagram of a hydrometallurgical copper extraction process according to one embodiment of the invention, which is suitable for the treatment of high grade copper ores or concentrates.

FIG. 1 is a flow diagram of Mode A. The process comprises a pressure oxidation stage 12 in a pressure oxidation vessel or autoclave, an atmospheric leach stage 14, primary and secondary solvent extractant stages 16 and 18, respectively, and an electrowinning stage 20.

In the pressure oxidation stage 12, all copper minerals are converted to basic copper sulphate, $CuSO_4.2Cu(OH)_2$. The treatment is carried out with oxygen in the presence of an acidic chloride solution. Oxygen, as well as HCl and $H_2SO_4$ are introduced into the autoclave for this purpose. The temperature in the autoclave is about 130°–150° C. and the pressure about 100–200 psig (1380 kPa). This is total pressure comprising oxygen pressure plus steam pressure. The retention time is about 0.5–2.5 hours and the process is normally carried out in a continuous fashion in the autoclave. However, the process can also be carried out in a batch-wise fashion, if desired.

The solids content in the autoclave is maintained at about 12–25%, i.e. 150–300 g/L solids as determined by the heat balance and viscosity limitations.

The slurry produced in the autoclave is discharged through a series of one or more flash tanks 22 to reduce the pressure to atmospheric pressure and the temperature to 90°–100° C. The liquid part of the slurry is referred to as the product solution from the pressure oxidation stage 12 and is indicated by reference numeral 21.

The slurry from the flash tank(s) 22 is filtered, as shown at 24, and the resultant filter cake is washed thoroughly to remove entrained liquor as much as possible.

The pressure oxidation filtrate from the filtration 24 is recycled to the pressure oxidation stage 12 but there is a small bleed of about 5%, as shown at 26. This bleed 26 is determined by the concentration of the soluble metals in the ore or concentrate which may dissolve during the pressure oxidation stage 12. The bleed 26 is treated at 28 with lime to remove metals such as zinc and magnesium as solid residues, which are present in the copper concentrate, and to counteract buildup of these metals in the pressure oxidation circuit. The pressure oxidation circuit is the circuit from the pressure oxidation stage 12 to the flash tank(s) 22 to the filtration 24 to the bleed 26 and back to the pressure oxidation stage 12. It is indicated by reference numeral 23.

The bleed 26 is subject to a solvent extraction, as shown at 27, prior to the bleed treatment 28. The solvent extraction 27 is carried out by means of a suitable organic extractant to remove copper from the bleed 26. This solvent extraction is associated with the solvent extraction stages 16 and 18 and will be referred to again when the latter two solvent extraction stages are described.

Prior to the pressure oxidation stage 12, the copper concentrate is first subjected to a regrind, as shown at 30, to reduce the particle size to about 97% minus 325 mesh, which corresponds to P80 (80% passing) 15 micron. The regrind 30 is carried out in solution recycled from the bleed treatment 28. Thus, the slurry from the bleed treatment 28 is subjected to a liquid/solid separation, as shown at 32, and the solution is recycled to the regrind 30 and the zinc/magnesium bleed residue is discarded, as shown at 17.

The solution which is recycled to the regrind 30 is an alkaline chloride liquor at about pH 10. Use of this liquor minimizes water input into the pressure oxidation circuit 23 which is important in maintaining heat balance and in preserving the chloride solution in the pressure oxidation circuit 23 as much as possible.

As stated above, copper is not leached in the pressure oxidation stage 12 but is converted to an insoluble basic copper salt. The feed solution to the pressure oxidation stage 12, which is the leach liquor being recycled from the filtration 24 is indicated by reference numeral 25. Although there is copper present in the feed solution 25, there is no additional copper leached, i.e. the process is operated so that the copper concentration in the feed solution 25 to the pressure oxidation stage 12 is equal to the copper concentration in the product solution 21 from the pressure oxidation stage 12. This is indicated as: $\Delta[Cu^{2+}]=0$.

The feed solution 25 to the pressure oxidation stage 12 contains about 15 g/L Cu and 12 g/L Cl, together with about 30–55 g/L sulphuric acid. The acid is added in the form of make up $H_2SO_4$ (usually 93%). The product solution 21 from the pressure oxidation stage 12 also contains about 15 g/L Cu and 11–12 g/L Cl but is at about pH 3. There is substantially no acid left in the product solution 21 as it is all consumed in the pressure oxidation stage 12 to form the basic copper salt.

As referred to above, the liquid feed 25 to the pressure oxidation stage 12 is made up partly of recycled filtrate to which $H_2SO_4$ is added. The immediate effect of adding the acid to the filtrate is to increase the acidity of the filtrate which is fed to the autoclave for the pressure leaching stage 12, but the most important effect, surprisingly, has been found to be that the addition of the acid, or more specifically the sulphate ions, actually suppresses the oxidation of sulphur emanating from the concentrate in pressure oxidation stage 12.

Typically the oxidation of sulphur that is experienced if no acid is added is about 25–30% of the feed sulphur in the concentrate, as is the case with the process described in U.S. Pat. No. 4,039,406. However, if acid is added, it has been found that the sulphur oxidation to sulphate is reduced to about 5–10%. This improvement has substantial beneficial effects on the hydrometallurgical extraction process. The oxidation of sulphur to sulphate creates additional costs in several ways, such as additional oxygen required for the reaction, additional reagent required to neutralize the acid so formed by the oxidation and provision must be made for heat removal due to the oxidation of sulphur to sulphate which is very exothermic. This actually limits the throughput of the autoclave in which the pressure leaching stage 12 takes place.

The chemistry of the reaction in the pressure oxidation stage 12 is believed to be altered by the addition of the acid as follows:

No acid addition:
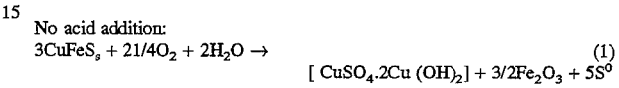
$$3CuFeS_2 + 21/4 O_2 + 2H_2O \rightarrow \quad\quad (1)$$
$$[CuSO_4.2Cu(OH)_2] + 3/2 Fe_2O_3 + 5S^0$$

With acid addition:
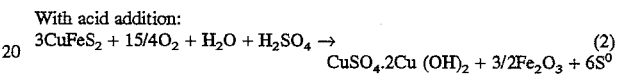
$$3CuFeS_2 + 15/4 O_2 + H_2O + H_2SO_4 \rightarrow \quad\quad (2)$$
$$CuSO_4.2Cu(OH)_2 + 3/2 Fe_2O_3 + 6S^0$$

In both reactions, the copper is precipitated in the form of a basic copper salt, which has been found to comprise mostly basic copper sulphate.

In the first reaction it appears that the sulphate of the basic copper sulphate is supplied by oxidation of the feed sulphur in the concentrate, whereas in the second reaction it appears to be supplied by the sulphate ions in the acid which is added to the autoclave, thus obviating the need for the oxidation of sulphur to sulphate. Thus, in the second reaction, there is a nett consumption of sulphate ions to form the basic copper salt. The amount of sulphuric acid needed to suppress sulphur oxidation has been found experimentally to be about 25 to 75 grams per liter, depending on the type of concentrate and the percentage solids in the concentrate.

In actual test work, there is more sulphur oxidation than is predicted by either reaction. The first reaction predicts one sixth or 16.7% of the sulphur to be oxidized, whereas experimentally about 25%–30% is found. With acid addition, experiments indicate that about 2–16% sulphur is oxidized to sulphate, rather than the zero oxidation that would be predicted if the second reaction as written was the only reaction taking place. Therefore, these reaction equations do not reflect exactly what is happening in the pressure leaching stage 12 but are only an approximation.

Chloride is conserved as much as possible in the pressure oxidation circuit 23 but typically about 3–10% chloride is lost per pass into the solid product at the filtration 24. Thus, the chloride must be made up by the addition of HCl or another source of chloride to provide 12 g/L chloride in the feed solution 25. The chloride losses are minimized by thorough washing of the solids from the pressure oxidation stage 12 on the filter 24. The amount of wash water is constrained by the requirement to maintain a water balance in the pressure oxidation circuit 23. The only water loss from the circuit 23 is in the steam 29 from the flashing step 22 and in the filter cake after the filtration 24. Hence, the need to use the recycled solution from the bleed treatment 28 to slurry up the concentrate in the grinding step 30, and thus minimize fresh water input from the concentrate to the pressure oxidation step 12.

It has been found to be advantageous to maintain at least 15 g/L Cu in the product solution 21 from the pressure oxidation stage 12 so as to counteract chloride loss in the form of solid basic copper chloride, $CuCl_2.3Cu(OH)_2$, which can occur if insufficient copper is present in solution to allow basic copper sulphate to form:

$$4CuCl_2 + 6H_2O \rightarrow CuCl_2 \cdot 3Cu(OH)_2 + 6HCl \quad (3)$$

This reaction can be counteracted by the addition of sufficient acid into the autoclave during the pressure oxidation stage 12 to maintain at least enough copper in solution to satisfy the stoichiometric requirements for Cl as $CuCl_2$. For 12 g/L Cl in solution, the stoichiometric amount of Cu is:

$$\frac{63.5}{71} \times 12 = 10.7 \text{ g/L Cu}$$

Thus, 15 g/L Cu is a safe minimum to prevent a significant chloride loss in the form of the basic copper salt.

On the other hand, the copper concentration in the product solution 21 from the pressure oxidation stage 12 should be kept as low as possible to counteract the formation of CuS by the reaction of elemental sulphur with aqueous copper sulphate. This reaction can occur during the pressure oxidation stage 12 or in the slurry after discharge from the autoclave but before the filtration step 24:

$$3CuSO_4(aq) + 4S^0 + 4H_2O \rightarrow 3CuS(s) + 4H_2SO_4 \quad (4)$$

This reaction is particularly undesirable because CuS is insoluble in the dilute acid conditions of the atmospheric leaching stage 14. Thus, the copper is not recovered and this results in the loss of copper to the final residue.

To counteract the formation of CuS it is necessary to keep the copper concentration in the product solution 21 as low as possible, i.e. below 30 g/L for some concentrates. The tendency to CuS formation is apparently related to the type of concentrate being treated, with the medium to high grade concentrates being more susceptible to CuS formation. Thus, although a high copper concentration in the product solution 21 does not present a problem with the low grade concentrates, it cannot be tolerated with the higher grade concentrates.

As is known to date, high grade concentrates, i.e. above 35% copper, are best treated to produce as low a copper concentration in the product solution 21 as possible, i.e. below 25 g/L Cu.

Given the need to maintain at least 15 g/L Cu in solution in the pressure oxidation circuit 23, there is an optimum range of copper concentration of from 15 to 25 g/L Cu for high grade concentrates. With medium grade concentrates, the upper limit can be stretched considerably and for low grade ore, the copper concentration does not play a significant role.

The copper concentration in the pressure oxidation filtrate 29 can be controlled simply by adding the required amount of acid into the feed solution 25 to the pressure oxidation stage 12. More acid results in a higher copper concentration due to the dissolution of the basic copper sulphate:

$$CuSO_4 \cdot 2Cu(OH)_2(s) + 2H_2SO_4 \rightarrow 3CuSO_4(aq) + 4H_2O \quad (5)$$

The addition of about 1 g/L acid results in an increase in copper concentration of about 1 g/L. The actual concentration of acid required is determined empirically by comparing the assays of feed solution 25 to the pressure oxidation stage 12 and the product solution 21 from the pressure oxidation stage 12 to satisfy $\Delta[Cu^{2+}]=0$. The volume of solution in the circuit 23, however, is determined by the heat balance.

The percentage by weight of solids in the feed of copper concentrate slurry to the pressure oxidation stage 12 can be varied at will. The weight of concentrate solid fed to the pressure oxidation stage 12 is determined by the amount of copper to be recovered. The weight of the solution is determined mainly by the heat balance in the pressure oxidation stage 12.

The desired operating temperature in the pressure oxidation stage 12 is about 150° C. and the heat must be supplied largely by the heat of reaction of the sulphide minerals with the high pressure oxygen in the autoclave. For high grade concentrates, such as will be treated by the Process Mode A currently being described, this means a relatively low S/Cu ratio and thus a smaller heat production per tonne of copper treated in the autoclave. Much of the heat evolved is due to oxidation, not of copper, but of the other two main elements in the concentrate, iron and sulphur. If the grade of the concentrate is high, then the ratio of S/Cu and Fe/Cu is low, hence a lower heat production.

To reach operating temperature from a starting temperature of say 50° to 80° C., which is typical for the pressure oxidation filtrate 29 which is recycled after the filtration 24, it is necessary to control the amount of water that must be heated, since this is the main heat sink in the pressure oxidation stage 12. It is impractical to cool or heat the slurry inside the autoclave by indirect means, such as by means of heating or cooling coils, because of rapid scale formation on all surfaces, particularly heat exchangers, leading to very poor heat transfer characteristics. Direct heating or cooling by injection of steam or water is also impractical due to water balance considerations. Therefore, it is required that the heat balance be maintained by balancing heat production from reaction heat with the heat capacity of the feed materials, i.e. the feed solution 25 being recycled and the concentrate slurry. The main variable that can be controlled here is the volume of the feed solution 25. This is one of the distinguishing features between Modes A and B. In Process Mode B, still to be described, the heat evolution is much greater, expressed as heat per tonne of copper product. Therefore, it is possible to use more solution volume in the feed 25 to the pressure oxidation stage 12.

Once the solution volume is fixed, the acidity of the solution can be determined, since the total mass of acid is determined by the need to maintain $\Delta[Cu^{2+}]=0$. Typically, for a high grade concentrate, about 35-55 g/L acid will be required.

It has been found to be beneficial to add small concentrations of certain surfactants which change the physical and chemical characteristics of liquid elemental sulphur (S) in the autoclave during the pressure oxidation stage 12. Surfactants such as lignin sulphonate and quebracho added to the pressure oxidation feed solution 25 in small amounts, i.e. 0.1 to 3 g/L can reduce the viscosity of the liquid sulphur and also change the chemistry in the autoclave.

Additions of surfactants can reduce sulphur oxidation in ways that are not well understood, but are beneficial to the process. It is believed that this is due to lower viscosity, resulting in lowered tendency for liquid sulphur and solids to be held up within the autoclave, thus reducing the retention time for these materials, and hence the reduced tendency for sulphur oxidation to occur.

Also it has been found that more complete reaction of the copper minerals takes place if surfactants are added, apparently because of lower viscosity sulphur, which does not "wet" unreacted sulphide minerals, and thus allows the desired reaction to proceed to completion.

Reaction (5) describes how adding sulphuric acid to the pressure oxidation feed 25 will control the copper concentration in the pressure oxidation filtrate 29. The overall reaction for the pressure oxidation with sulphuric acid addition for a chalcopyrite ore is given by reaction (2) above.

A similar reaction can be written using $CuSO_4$ as the source of sulphide ions instead of $H_2SO_4$:

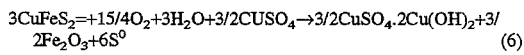

$$3CuFeS_2 + 15/4 O_2 + 3H_2O + 3/2 CuSO_4 \rightarrow 3/2 CuSO_4 \cdot 2Cu(OH)_2 + 3/2 Fe_2O_3 + 6S^\circ \quad (6)$$

It is noteworthy that there are 3/2 moles of sulphate required as copper sulphate in reaction (6) compared to one mole of sulphuric acid in reaction (2). Therefore, if $CuSO_4$ is to be used as the source of sulphate ions instead of sulphuric acid, it is necessary to use 1.5 times as many moles of $CuSO_4$. To take this into account, the inventor has developed the concept of Excess Sulphate Equivalent, which allows the calculation of how much acid to add to the pressure oxidation feed solution 25 in order to achieve a target copper concentration and still take into account reaction (6).

By taking reaction (6) into account, it is possible to calculate "a priori" the amount of acid required for constant copper concentration in the pressure oxidation filtrate 29. The concept of Excess Sulphate Equivalent is helpful:

Excess Sulphate Equivalent is equal to the sulphate available in the pressure oxidation feed solution 25 for formation of basic copper sulphate during the pressure oxidation stage 12. The sulphate available is that which is in excess of a defined Base Level of $CuSO_4$ and $CuCl_2$.

Base Level of $CuSO_4$ and $CuCl_2$ is sufficient to support chloride in solution at 12 g/L in the form of $CuCl_2$ and, in addition, about 4.3 g/L Cu as $CuSO_4$. The concentration of $CuCl_2$ corresponding to 12 g/L chloride in solution is 134.5/71*12=22.7 g/l $CuCl_2$, which contains 10.7 g/L Cu in solution. The additional 4.3 g/L copper therefore means a total of 15 g/L copper combined as CuCl=and $CuSO_4$ in the Base Level.

Sulphate available is then the total sulphate as $CuSO_4$ less the Base Level. For instance, if the total copper concentration is 28 g/L in the pressure oxidation filtrate 29, then the sulphate available is 28−15=13 g/L Cu*98/63.5=20 g/L $H_2SO_4$ as available sulphate from $CuSO_4$.

Excess Sulphate Equivalent (ESE) is then calculated from the available sulphate from $CuSO_4$ by dividing by 1.5:

$$ESE = \{Available\ Sulphate\ as\ CuSO_4\}/1.5$$

Thus, in the example of 28 g/L total copper concentration or 20 g/L available sulphate from $CuSO_4$, there is 20/1.5= 13.3 g/L ESE from $CuSO_4$.

Finally, if the target free acid equivalent is, say, 52 g/L $H_2SO_4$ in the pressure oxidation feed solution 25, then the amount of acid required is 52 less the ESE (13.3 g/L) or 38.7 g/L $H_2SO_4$. This is the amount that must be added to the feed solution 25 to the pressure oxidation stage 12 to produce a constant copper concentration in the pressure oxidation filtrate 29, i.e. the Base Level of 15 g/L Cu.

Other reactions can be written using $Fe_2(SO_4)_3$ and $ZnSO_4$ as the source of sulphate ions instead of $H_2SO_4$. In the case of $ZnSO_4$, the zinc is assumed to hydrolyze to basic zinc sulphate, $ZnSO_4 \cdot 3Zn(OH)_2$, which is a basic salt of Zn analogous to basic copper sulphate. These reactions are given below as reactions (7) and (8).

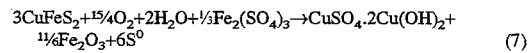

$$3CuFeS_2 + 15/4 O_2 + 2H_2O + 1/3 Fe_2(SO_4)_3 \rightarrow CuSO_4 \cdot 2Cu(OH)_2 + 11/6 Fe_2O_3 + 6S^\circ \quad (7)$$

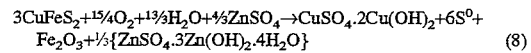

$$3CuFeS_2 + 15/4 O_2 + 13/3 H_2O + 4/3 ZnSO_4 \rightarrow CuSO_4 \cdot 2Cu(OH)_2 + 6S^\circ + Fe_2O_3 + 1/3\{ZnSO_4 \cdot 3Zn(OH)_2 \cdot 4H_2O\} \quad (8)$$

The solids from the pressure oxidation stage 12 after the filtration 24, are treated in the atmospheric leaching stage 14 at about pH 1.5 to pH 2.0 using raffinate from the primary leaching stage 16, which is acidic, to dissolve the basic copper sulphate. The leaching 14 takes place at a temperature of about 40° C. for a retention time of about 15–60 minutes. The percentage solids is typically about 5–15% or about 50–170 g/L, although it is possible to operate the process outside this range.

During the atmospheric leaching stage 14, the basic copper salts dissolve almost completely with very little of the iron present in the concentrate going into solution.

Typically, the leach liquor 33 produced after the liquid/solid separation 34 contains about 10–20 grams per liter copper, depending on the percentage solids feed to the leach 14, with 0.1–1.0 g/L iron and about 0.1–1.0 g/L chloride. Much of this iron and chloride are derived from the feed raffinate 37 rather than the solids from pressure oxidation, i.e. they are recycled. Typically about 0.1–0.2 g/L iron and chloride dissolve per pass.

The copper extraction has been found to be about 95–98% based on the original feed to the pressure leaching stage 12. Iron extraction to solution has been found to be less than about 1%.

The slurry 31 from the atmospheric leaching stage 14 is difficult if not impossible to filter, but settles well. In view of the need to wash the leach solids very thoroughly, the slurry 31 is therefore pumped to a counter current decantation (CCD) wash circuit, symbolically indicated as a solid/liquid separation 34 in FIG. 1. In the CCD circuit 34, the solids are fed through a series of thickeners with wash water added in the opposite direction. By this method, the solids are washed and entrained solution removed. About 3 to 5 thickeners (not shown) are required with a wash ratio (water to solids) of about 5 to 7 to reduce entrained liquor down to less than 100 ppm Cu in the final residue.

The thickener underflow from the last thickener is the final residue stream 35 at about 50% solids. This can be treated for the recovery of precious metals, such as gold and silver, or sent to tailings. Precious metals may be recovered by known methods, such as cyanidation. The main constituents of the stream 35 are hematite and elemental sulphur, which may be recovered by flotation if market conditions warrant.

The thickener overflow from the first thickener is the product solution 33 which is fed to the primary solvent extraction stage 16, as shown. This solution contains about 12 g/L Cu, 1 g/L Cl and 0.5 g/L Fe.

The optimum copper concentration is determined by the ability of the solvent extraction stage 16 to extract the maximum copper from the solution 33. Since a fraction of about one-third of the raffinate from the solvent extraction stage 16 is eventually neutralized, it is important to minimize the copper content of this raffinate.

Solvent extraction performs best on dilute copper solutions due to the fact that a concentrated copper solution results in a higher acid concentration in the raffinate which tends to lower extraction efficiency. More concentrated solutions are, however, cheaper to treat from a capital cost point of view, since the volume is less. Above a certain point, though, the increased concentration does not reduce the size of the solvent extraction unit, since (i) there is a maximum organic loading and (ii) aqueous volume is generally kept equal to organic volume for mixing purposes by means of aqueous recycle. Therefore, the total volume of organic extractant and aqueous solution is only determined by the volume of organic extractant. The maximum organic loading and hence volume of organic is determined by the concentration and characteristics of the particular organic solvent selected. For the typical solvent, LIX™ reagent from Henkel Corporation, the maximum loading per pass at 40% volume concentration in diluent is about 12 g/L Cu. Therefore, the product solution 33 also should contain about 12 g/L Cu.

The copper is extracted from the product solution 33 from the CCD thickener overflow in two stages of extraction in the primary solvent extraction stage 16 to produce a raffinate 37 with about 20 g/L free acid and about 0.3 to 1 g/L Cu. Most of this raffinate 37 is recycled to the atmospheric leaching stage 14 but about 25 to 30% is surplus to the acid requirements of the atmospheric leaching stage 14 and must be neutralized. This surplus 121 is split off as shown at 36 and neutralized.

The neutralization is effected in two stages to maximize copper recovery and to prevent possible environmental problems with the neutralization residue due to copper content, i.e. the unrecovered copper from the raffinate 37 will precipitate upon neutralization and can then re-dissolve later, in a tailing pond, for example.

The first stage neutralization takes place at pH 2 to pH 3, as shown at 38, using limerock, which is very economical as a reagent, compared with lime. The neutralization product is filtered at 40 and the resultant solids are washed with water from the external source 45. The solids, which are mainly gypsum and iron hydroxides, are discarded, as shown at 41.

The filtrate 39 is sent to the secondary solvent extraction stage 18 for the recovery of residual copper values. The secondary solvent extraction 18 benefits from the primary neutralization 38 and results in a very low copper concentration in the secondary raffinate 43, typically from about 0.03 to 0.06 g/L Cu.

As indicated by the broken lines in FIG. 1, the secondary solvent extraction stage 18 uses the same organic extractant as the primary solvent extraction circuit 16. This is also tied in with the solvent extraction 27 of the pressure oxidation filtrate bleed 26. The organic extractant which is washed at 42 with wash water 122 from an external source 45, and stripped at 44 is recycled to the secondary solvent extraction stage 18 and then passes to the primary extraction stage 16. The stripped organic 125 is split to pass a portion thereof to the solvent extraction 27. The raffinate from the solvent extraction 27 is added to the loaded organic 123 from the solvent extraction 16 prior to the wash 42. The wash water 47 from the wash 42 is passed to the pressure oxidation filter 24, to serve as a feed wash water onto the filter 24. The resultant wash filtrate is added to the pressure oxidation filtrate 29, thus recovering the copper and chloride content from the solvent extraction wash water (47).

The raffinate 43 from the secondary solvent extraction stage 18 is neutralized again in a secondary neutralization stage 46, this time at pH 10 and filtered at 48 to remove all dissolved heavy metals, producing a solution 51 which is used as wash water in the CCD circuit 34 for washing the final leach residue 35. The solid residue from the filtration 48 is discarded, as shown at 53.

Stripping of the loaded and washed organic at 44 is effected by means of spent acid or electrolyte 55 from the electrowinning stage 20 to obtain a pure copper sulphate solution or pregnant electrolyte 57 which is then passed to the electrowinning stage 20 for electrowinning in the usual way.

It can be seen that all solution streams in the process are thus recycled and there are no solution effluents from the process. Only solid residues are discarded from the process.

Process Mode B

Figure 2:
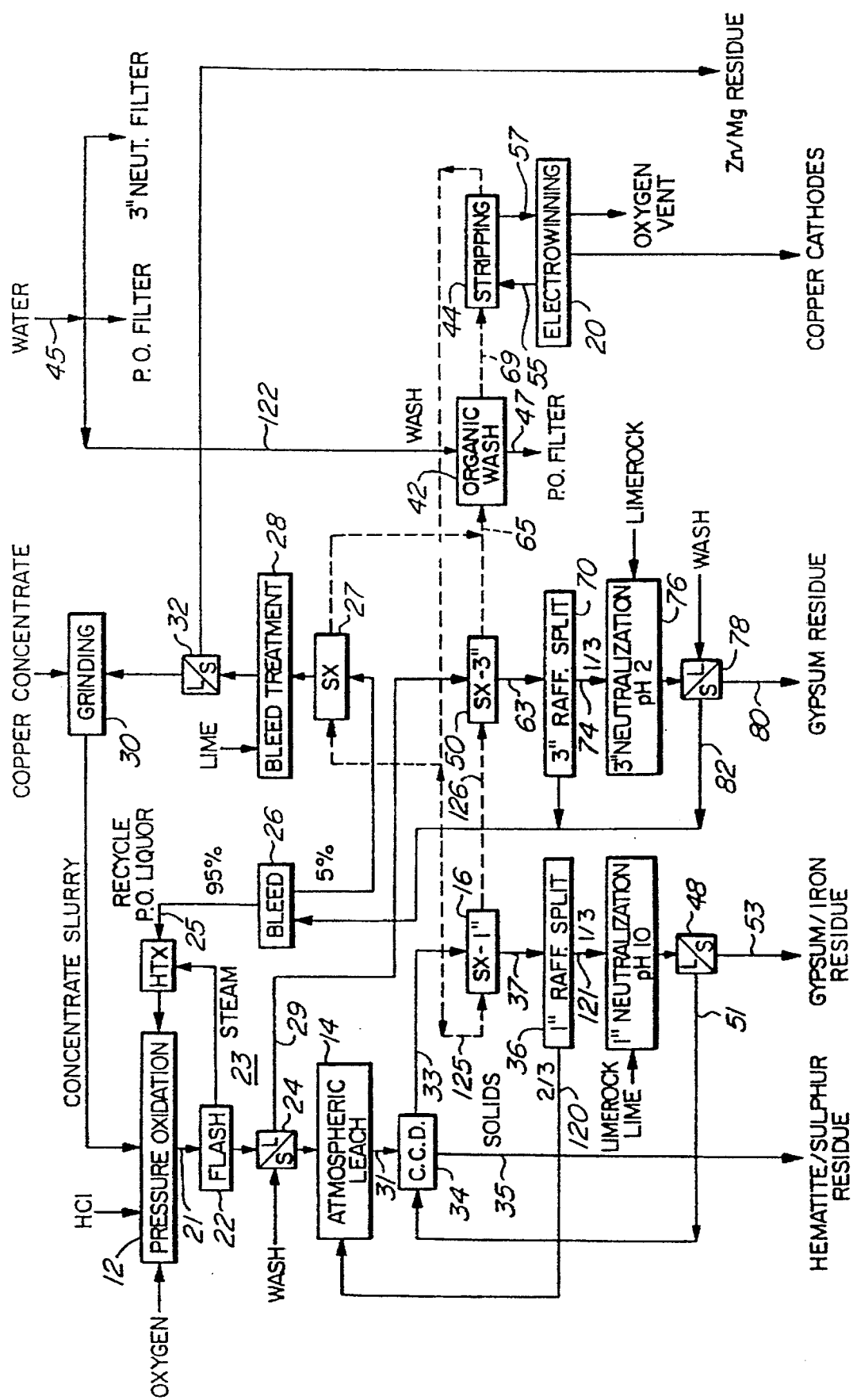
FIG. 2 is a flow diagram of a hydrometallurgical copper extraction process according to another embodiment of the invention, which is suitable for the treatment of medium and lower grade copper ores or concentrates.

FIG. 2 is a flow diagram of Mode B. The same reference numerals are used to indicate stages or steps in the process which correspond with those in the previous embodiment of FIG. 1. For example, the pressure oxidation stage is again indicated by 12, the atmospheric leach stage by 14, the electrowinning stage by 20, the flash tank(s) by 22, the pressure oxidation filtration by 24, the bleed treatment of the pressure oxidation filtrate 29 by reference numeral 28, the grinding stage by reference numeral 30 and the CCD wash circuit by reference numeral 34.

In this mode of the process, the pressure oxidation 12 is carried out both to oxidize and to leach into solution most of the copper contained in the feed concentrate. Typically about 85–90% of the copper is leached into the solution, with only about 10–15% being left in the residue as the basic copper sulphate.

The conditions of the pressure oxidation stage 12 in the autoclave are similar to those in Process Mode A except that the percentage solids is lower, i.e. 150–225 g/L.

In this mode of the process, $\Delta[Cu^{2+}]$ is typically 30 to 40 g/L Cu, i.e. the copper concentration is greater in the product solution 21 from the pressure oxidation stage 12. The feed solution 25 to the pressure oxidation stage 12 typically contains 10–15 g/L Cu and 12 g/L Cl, together with about 20 to 30 g/L sulphuric acid.

In this mode, no sulphuric acid is added to the pressure oxidation stage 12 from an external source, as is the case with the FIG. 1 embodiment. In this mode, the acid is obtained from recycle in the process, i.e. by the recycle of the pressure oxidation filtrate 29. The product solution 21 from the pressure oxidation stage 12 contains about 40 to 50 g/L Cu and 11 to 12 g/L Cl at about pH 2 to 2.5.

The copper leached into the product liquor 21 from pressure oxidation stage 12 must be controlled so as to obtain the desired distribution of copper between liquor (85 to 90%) and residue (10 to 15%). This distribution results in a small but important amount of basic copper sulphate solids in the leach residue. The pH is a convenient indicator of the presence of basic copper sulphate, since it is a buffering agent. With strong copper sulphate concentration in solution, a pH range of 2 to 2.5 indicates basic copper sulphate. Below pH 2 almost all the basic copper sulphate will be dissolved, whereas above pH 2.5, too much basic copper sulphate is formed and insufficient copper is likely to be found in the solution 21.

The primary method of control is the amount of acid in the feed liquor 25 to the pressure oxidation stage 12. The acid level in turn is controlled by the degree of neutralization of the raffinate from solvent extraction of the pressure oxidation filtrate 29 raffinate described below. Usually, about 25 to 50% of the acid must be neutralized, depending on the amount of acid that is required.

The acid generated during the pressure oxidation stage 12 varies from one concentrate to another and according to conditions employed. If the concentrate produces a large amount of acid during the pressure oxidation stage 12, then the feed solution 25 will need less acid to achieve the desired result. The minimum copper (from concentrate feed) that should go to liquor 21 is about 10%. Below 10%, the pH drops sufficiently low so that iron concentrations in the pressure oxidation filtrate 29 increase rapidly. Normally, iron is about 10 to 50 ppm, but if pH is below 2 and basic copper sulphate in residue disappears, then iron can increase to above 1 g/L fairly quickly. This is undesirable because there are several impurity elements such as As and Sb which are only removed from solution simultaneously with iron hydrolysis. Therefore, absence of iron in solution is a good guarantee of low impurity content in the pressure oxidation filtrate 29. Iron is also an impurity itself that must be avoided in the electrowinning circuit 20 as far as possible.

There is another factor, however, which places a maximum on Cu in solution. It has been found surprisingly that certain concentrates actually leach more completely if the copper concentration is lower. This is believed to be due to either formation of secondary CuS, as described above, or to some other phenomenon related to poor oxidation characteristics of the primary mineral, chalcopyrite, in high copper concentration solutions. It is found that elemental sulphur, produced during the reaction in the pressure oxidation stage 12, can coat or actually encapsulate unreacted chalcopyrite particles and hinder the access of reagents. This results in poor copper recovery. The phenomenon is apparently accentuated by high Cu levels in solution. It can be overcome or mitigated by the use of surfactants, as described above. The problem is more severe with some concentrates, particularly high grade, than others. Therefore, for these concentrates it is desirable to limit the copper concentration in the pressure oxidation filtrate (i.e. greater than about 95%) over all. To do this, it is necessary to have a substantial proportion of the copper as basic copper sulphate, i.e. in solid residue from the pressure oxidation stage 12 rather than the pressure oxidation filtrate. Typically, 20–40% of copper may report to solids, if necessary, to keep the copper concentration low enough to obtain high copper recovery.

Higher grade concentrates exhibit the problem of low copper recovery with high copper in solution. Therefore, an increasing proportion of copper must report to solids as the grade increases. Tests with three different concentrates illustrate this relationship:

| Conc. # | % Cu | $H^+$/Cu Molar | Cu Distribution % | | Total recovered |
|---|---|---|---|---|---|
| | | | PO liquor | PO residue | |
| 1 | 41 | 0.55 | 0 | 100 | 97.3 |
| 2 | 28 | 0.70 | 63 | 37 | 95.7 |
| 3 | 22 | 0.96 | 85 | 15 | 94.7 |

The $H^+$/Cu molar ratio refers to $H^+$ in the feed acid and Cu in the feed concentrate. The $H^+$ in the feed acid is taken to be all the protons available on complete dissociation of the acid even if under existing conditions the acid is not completely dissociated. The $H^+$ shown in the table is optimum level found by experiment to give the best results.

For concentrate #1, which was a high grade concentrate, the process chosen is Mode A, where all of the copper reports to the leach liquor and $\Delta[Cu^{2+}]=0$. The $H^+$/Cu ratio is that found which was necessary by experimentation to give the desired result of $\Delta[Cu^{2+}]=0$.

For concentrate #2, a medium grade concentrate, Mode B was chosen, but with a substantial amount of the copper reporting to the solid basic copper sulphate. This was achieved by keeping the $H^+$/Cu ratio low enough so that not all of the copper dissolved into the liquor.

For concentrate #3, a low grade concentrate, Mode B was also chosen but in this case, the minimum amount of copper reported to the residue, by adjusting the $H^+$/Cu ratio high enough.

The residue from the pressure oxidation stage 12 is leached 14 with raffinate 37 returning from the solvent extraction 16 which is dilute acid, at 3–10 g/L $H_2SO_4$. Since most of the copper from the pressure oxidation stage 12 reports to the pressure oxidation filtrate 29 and only a small fraction of the pressure oxidation residue, the resultant leach liquor 31 from the atmospheric leach 14 is quite dilute in copper. In turn, this produces a dilute raffinate 37 from the solvent extraction 16. Typically, the atmospheric leach liquor 31 is 3–7 g/L Cu and 0.2 to 0.5 g/L Fe.

The slurry resulting from the atmospheric leaching stage 14 is difficult to filter, as was the case with Mode A. Good liquid/solid separation and washing, however, can be achieved as before using a series of thickeners in a CCD arrangement 34. Wash water 51 is provided by raffinate from the solvent extraction 16, which is neutralized, as indicated at 46. This is similar as in Mode A. The only major difference is the lower tenor of the solution 33 and the reduced volume.

The solution 33 produced by the atmospheric leaching stage 14 is subjected to the solvent extraction 16. The copper containing solution 29 from the pressure oxidation stage 12, is subject to a solvent extraction stage 50. There are, therefore, two solvent extraction operations, i.e. 16 and 50, treating two different streams of liquor 33 and 29, respectively. It is a feature of the process according to the invention that the organic extractant used for effecting the solvent extraction operations is common to both solvent extractions 16 and 50.

As shown in FIG. 2, the stripped organic 125 coming from the common stripping operation 44 is first introduced into the solvent extraction circuit 16, which has the weakest copper concentration in the aqueous feed stream 33 and therefore needs the organic extractant to be as low as possible in loading to be effective.

The loaded organic 126 from solvent extraction 16 is then sent to the solvent extraction 50 where it contacts the higher copper concentration liquor 29. It is not necessary for the solvent extraction 50 to achieve a high extraction ratio because the raffinate 63 from this extraction is recycled to the pressure oxidation stage 12, as shown. On the other hand, the raffinate 37 from the solvent extraction 16 is only partly recycled and part is neutralized 46 to remove excess acid from the circuit. Therefore, it is more important to achieve high copper recovery from the solvent extraction 16.

The raffinate 37 from the solvent extraction 16 is split at 36 as in Mode A, with about one-third 121 to the neutralization 46 and two-thirds 120 recycled to the atmospheric leach stage 14. An important difference from Mode A is that the raffinate 37 from solvent extraction 16 is sufficiently low in copper, i.e. below 100 ppm, so that it is not necessary to have a secondary solvent extraction stage before neutralization 46, as was the case in Mode A. This is due to the lower copper concentration and solution volume, allowing the solvent extraction 16 to be more efficient.

The loaded organic 65 produced by the two solvent extraction operations 16, 50 in series, is washed in two stages in counter current fashion with dilute acidic aqueous solution 122, as shown at 42. This is primarily to remove entrained aqueous solution from the loaded organic 65 and in particular to reduce the chloride content before the organic goes to stripping at 44. The amount of wash water required is about 1–3% of the organic volume. The resultant wash liquor 47 produced is recycled to the pressure oxidation stage 12.

The washed organic 69 is stripped at 44 with spent electrolyte 55 from the electrowinning stage 20 to provide a pure copper solution or pregnant electrolyte 57 for electrowinning in the usual way.

The raffinate 63 is split at 70 in two portions 72, 74 as determined by the required molar ratio of $H^+$/Cu. The portion 72 is recycled to the pressure oxidation stage 12. The portion 74 is neutralized at pH 2 with limerock at 76 and filtered 78. The solid residue is washed and discarded, as shown at 80. The filtrate 82 is recycled with the portion 72 to form the feed solution 25 to the pressure oxidation stage 12.

A novel feature of the process, therefore, is the use of a common organic to extract copper from two separate aqueous feed liquors. This provides considerable economies in lower capital and operating costs in the solvent extraction circuits. Also, it allows for the use of copious amounts of water in the atmospheric leaching CCD circuit, so that good washing can be achieved on the final residue and yet still recover copper from such a dilute liquor.

It has been found that the degree of sulphur oxidation that occurs in the pressure oxidation stage 12 is highly dependent on the type of concentrate, such as grade and mineralogy of the concentrate being treated, as well as the conditions of the pressure oxidation stage 12. Certain concentrates exhibit considerably higher sulphur oxidation, i.e. oxidation of the sulphur in the concentrate to sulphate, and the effect is particularly marked with the low grade concentrates with less than about 28% Cu by weight. The inventor has found that the significance of this variation is not so much the copper grade itself but the copper/sulphur ratio in the concentrate. The main impurity elements in a copper concentrate are iron and sulphur due to the fact that copper ores are generally composed of chalcopyrite together with other minerals, particularly pyrite $FeS_2$ or pyrrholite FeS.

Process Mode B deals with the problem of excess sulphur oxidation in the pressure oxidation stage 12 when lower grade concentrates are used by deliberately dissolving 90% of the copper and minimizing the formation of basic copper sulphate. The reaction for chalcopyrite is:

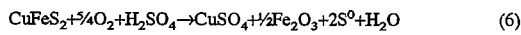

$$CuFeS_2 + 5/4 O_2 + H_2SO_4 \rightarrow CuSO_4 + \tfrac{1}{2}Fe_2O_3 + 2S^0 + H_2O \qquad (6)$$

The filtrate 29 from the pressure oxidation stage 12 thus contains high levels of copper sulphate and copper chloride and this is treated in the solvent extraction stage 50 to produce a pure copper sulphate solution which goes to the electrowinning stage 20.

Figure 3:
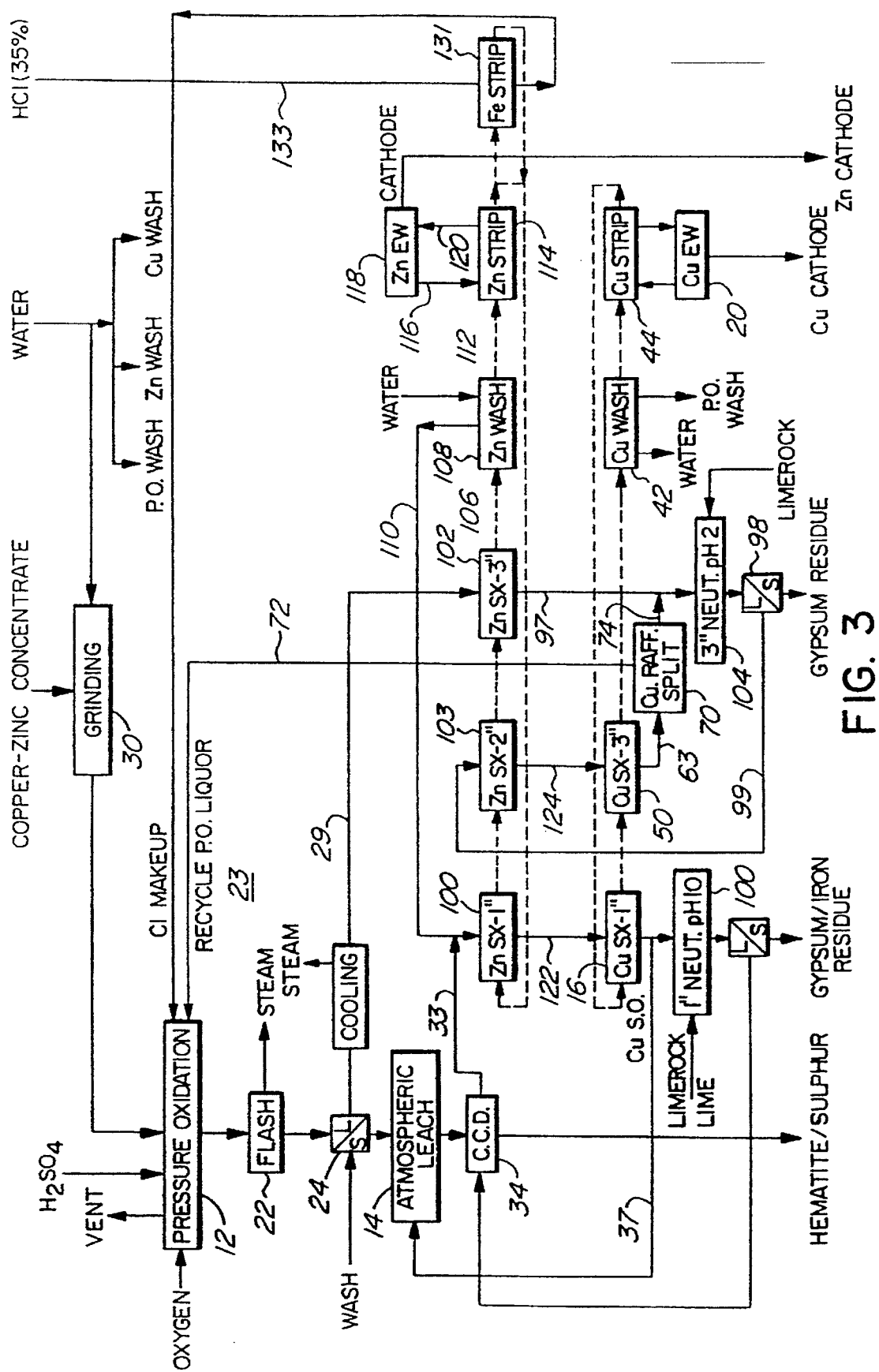
FIG. 3 is a flow diagram of a hydrometallurgical copper extraction process according to a further embodiment of the invention, which provides for the extraction of zinc in addition to copper.

With reference to FIG. 3, a hydro-metallurgical process for extraction of zinc in addition to copper is shown. The same reference numerals are used to indicate stages or steps in the process which correspond with those in the previous embodiments.

The concentrate is re-ground 30 as in the case of the previous embodiments.

The pressure oxidation of a mixed zinc-copper concentrate is carried out in similar fashion as for the concentrate containing only copper as in FIG. 2.

Zinc oxidizes as readily or more readily than copper does and is more likely to report to the leach liquor 29 as opposed to the pressure oxidation residue. This is because zinc hydrolyzes less readily as basic zinc sulphate than copper does, i.e. at higher pH.

Recovery of copper or zinc is not hampered by high solution tenors apparently as was found for high grade copper concentrations. Therefore, it is possible to have most of the copper and zinc report to the pressure oxidation filtrate 29, i.e. as in Process Mode B. Sulphur oxidation is low, so that the amount of acid generated within the pressure oxidation stage 12 is low. Hence, to obtain a high $H^+$/Cu ratio, it is necessary to recycle virtually all of the acid from the solvent extraction stage 12 with minimal neutralization. The feed acid may be as high as 75 g/L $H_2SO_4$ with about 10 g/L Cu, 5 g/L Zn and 12 g/L Cl.

The pressure oxidation filtrate 29 will contain both zinc and copper in substantial concentrations dependent on the feed concentrate composition. For a concentrate with 20% Cu and 5% Zn, the pressure oxidation filtrate 29 may contain about 50 g/L Cu, 15 g/L Zn and 12 g/L Cl.

The pressure oxidation residue is leached 14 in the same way using raffinate 37 from the solvent extraction 16 as shown, producing a mixed Cu-Zn solution for feed to the solvent extraction circuits. Zinc is extracted first and then copper.

There are two aqueous streams to be treated by solvent extraction as in Process Mode B for copper concentrates.

The pressure oxidation filtrate 29 contains high tenors of Cu and Zn, whereas the atmospheric leach solution 33 is weak in both elements.

The novel arrangement outlined for the solvent extraction circuit as for the embodiments described above, is continued for the zinc solvent extraction, that is, the weak liquor is contacted first with organic extractant followed by the strong aqueous liquor. In this case, there are two circuits, one for zinc and one for copper.

It is possible to extract copper first followed by zinc, depending on the choice of organic extractant and its relative affinity for the two elements. The applicant has found that satisfactory results can be obtained by using DEHPA (diethyl-hexyl phosphoric acid) as the first extractant, which is selective towards zinc over copper. Therefore, two DEHPA extractions 100 and 102 are done, the first extraction 100 is on the weak liquor 33 and the second extraction 102 is on the stronger liquor 29 from the pressure oxidation stage 12, to recover zinc and leave the bulk of the copper in solution.

The zinc extraction by DEHPA is hampered by poor extraction characteristics in the presence of high acid concentrations. In practice, this means that the extraction effectively stops at about pH 1.4 or about 7–10 g/L $H_2SO_4$. To deal with this problem, an interstage neutralization 104 at pH 2 is included for the zinc solvent extraction. Thus, the zinc solvent extraction occurs in two stages, i.e. the stage 102 and a second stage 103 with the neutralization 104 in between. Each stage 102, 103 will extract only 5–7 g/L zinc before being stopped by the resultant acid concentration in the raffinate. By using interstage neutralization 104, the total zinc extraction can be increased to 10 g/L Zn or more. The raffinate 97 from the first extaction stage 102 is neutralized to about pH 2 to 2.5 at 104 with inexpensive limerock ($CaCO_3$) to produce gypsum solids which are filtered off at 98 and discarded. The filtrate 99 is then fed to the second solvent extraction stage 103. The feed to the second stage is typically 10 g/L Zn and 50 g/L Cu at a pH of 2 to 2.5. After extraction, the second raffinate 124 is typically 5 g/L Zn, 50 g/L Cu and 8 g/L acid.

For the solvent extraction circuit 16, zinc concentrations are low enough so that this does not present a problem.

The optimum zinc content of the pressure oxidation filtrate 29 is determined largely by the ability of the zinc solvent extraction circuit to extract the zinc. Due to the fact that zinc is extracted quite weakly by the available extractants (e.g. DEHPA), there is a maximum of about 5–7 g/L Zn that can be extracted before the reaction stops due to acid buildup in the raffinate. Further extraction requires neutralization of the acid. With interstage neutralization it is possible to extract much higher levels of Zn, however, the interstage neutralization removes sulphate from the circuit which must be replaced either by sulphur oxidation or adding fresh acid to the pressure oxidation circuit 23.

One inter-neutralization stage is likely to be compatible with sulphate balance, therefore it is preferable to keep the $\Delta[Zn^{2+}]$, which is the zinc concentration in the pressure oxidation filtrate 29 minus the zinc concentration in the recycled raffinate 72, to about 10 g/L. Thus, if the feed acid to pressure oxidation recycled as raffinate 72 from solvent extraction contains 5 g/L Zn, then the product filtrate 29 from pressure oxidation should contain about 15 g/L Zn. This restriction on $\Delta[Zn]$ distinguishes the process for Zn compared to Cu. The greater extraction ability of Cu solvent extraction means that good extraction of Cu can be achieved with much higher acid levels, up to 75 g/L $H_2SO_4$ in raffinate compared to only about 7–10 for Zn. Hence Cu can be extracted from 50 g/L Cu feed streams.

After extraction, the loaded organic 106 from the Zn (DEHPA) circuit contains some Cu, as a result of imperfect selectivity of the DEHPA extractant towards Zn, and simple entrainment of the strong Cu liquor. Typically the Zn/Cu ratio in the loaded organic 106 from Zn solvent extraction is about 150 to 300:1. If not removed, all of the Cu will be stripped along with the Zn during solvent stripping 114, and thus will be stripped into the Zn pregnant electrolyte 120 which is fed to Zn electrowinning 118. Zn electrowinning requires a very pure pregnant electrolyte if it is to produce satisfactory (pure) Zn cathode at reasonable current efficiency. The Zn/Cu ratio must be about 100,000:1 in pregnant electrolyte. Therefore it is essential to remove almost all of the Cu either from the loaded organic 106 or later from the pregnant electrolyte before electrowinning. It is much easier to purify the loaded organic 106.

To remove this copper, several washing or treatment stages 106, e.g. 3 to 10, typically 5, are needed. Washing is done with dilute acidified zinc sulphate aqueous solution. The wash stages are arranged in series, i.e. the treated organic exiting from the first wash stage enters the second wash stage and so through all the other stages until the organic exits the last stage. Some zinc is washed out with the copper, therefore, it is necessary to minimize the amount of wash water added and make use of several wash stages arranged in counter current fashion instead.

The resultant wash liquor 110 produced is recycled to the atmospheric leach circuit for recovery of copper and zinc values.

After washing, the organic stream 112 from the DEHPA extraction is ready for stripping 114 with spent electrolyte 116 from a zinc electrowinning circuit 118. This produces a pregnant electrolyte 120 for electrowinning zinc at high current efficiency.

After the stripping 114 the extraction solvent is further stripped 131 for removal or iron prior to recycling of the extractant to the solvent extraction 100. The stripping 131 is effected with HCl makeup solution 133 which is introduced into the pressure oxidation stage.

The raffinates 122, 124 from the zinc extractions with DEHPA are each extracted with a selective copper extractant, such as LIX™, in solvent extractions 16 and 50, respectively.

The design of these two circuits 16, 50 is similar as in Process Mode B with a common organic used first in the solvent extraction 16 and then in the solvent extraction 50. The loaded organic is then washed and stripped as before as shown at 42 and 44, respectively.

Neutralization requirements in the solvent extraction 50 circuit are found to be low because of the prior neutralization in the zinc circuit.

The raffinates from the LIX™ extractions are recycled as before back to the pressure oxidation stage 12 and the atmospheric leach stage 14, respectively.

Figure 4:
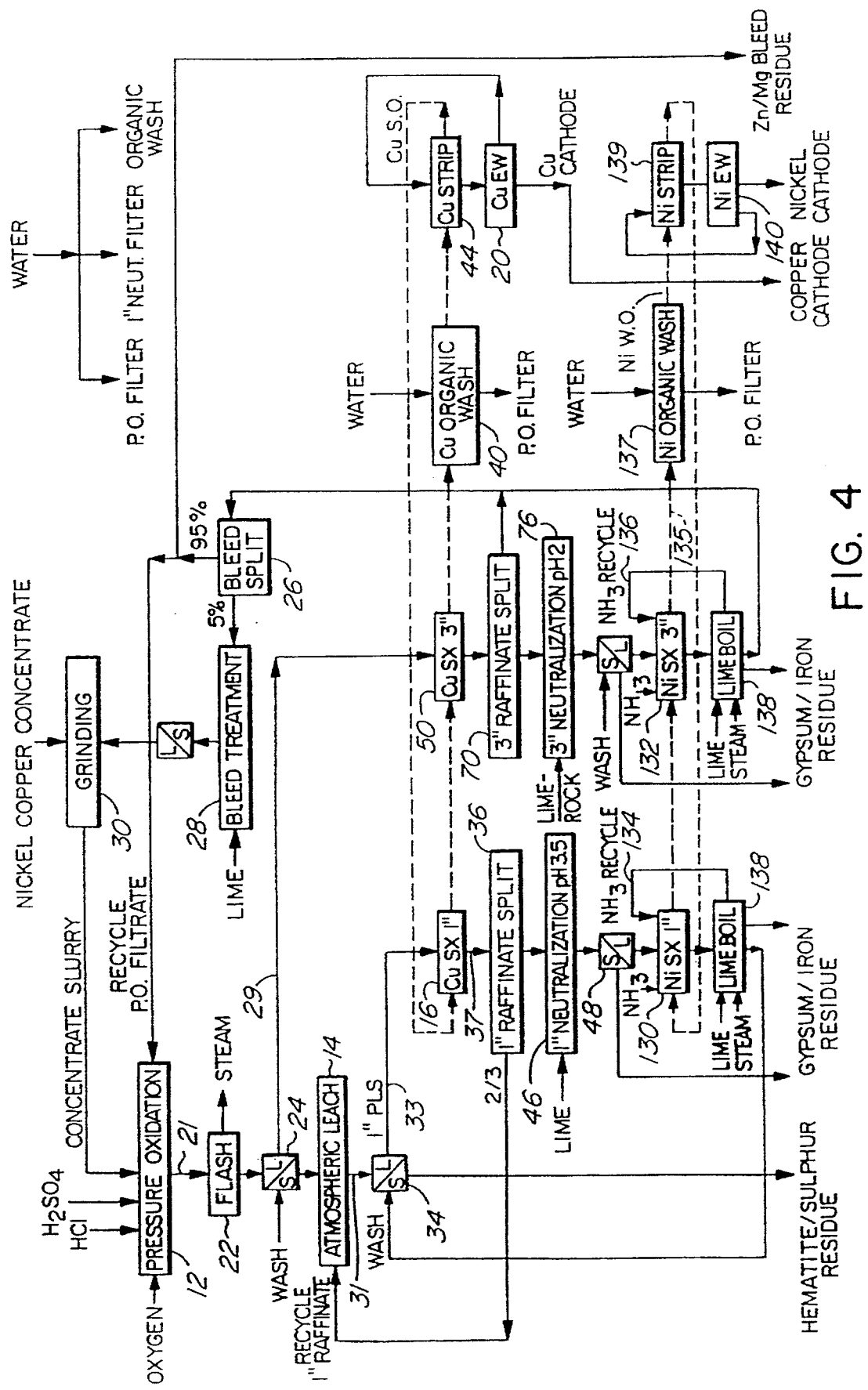
FIG. 4 is a flow diagram of a hydrometallurgical copper extraction process according to another embodiment of the invention, which provides for the extraction of nickel in addition to copper.

With reference to FIG. 4, a hydrometallurgical extraction process for recovery of nickel in addition to copper is shown.

The same reference numerals are used to indicate stages or steps in the process which correspond with those in the previous embodiments.

For nickel-copper concentrates, the process is very similar as for zinc, except that the available solvent extraction agents are all less selective toward nickel than copper. Therefore, the nickel solvent extraction circuits 130, 132 both are positioned after the respective copper solvent extraction circuits, 16, 50, respectively.

The loaded nickel extractant 135 from the solvent extraction 132 is subject to a wash 137 and then stripped 139 before being recycled to the solvent extraction 130. The stripping 139 is effected with spent electrolyte from the nickel electrowinning 140.

In addition, nickel extraction is sufficiently weak that in situ neutralization with ammonia, for example, is required, as indicated at 134 and 136, respectively. The ammonia must be recovered from the respective raffinates by a lime boil process 138, for example, and recycled.

The process according to the invention will now be further illustrated by way of Examples. Examples 1 to 7 illustrate the pressure oxidation stage 12 of the process. Examples 8 and 9 illustrate the operation of the atmospheric leach stage 14. Examples 10 and 11 illustrate the solvent extraction stages of the process.

EXAMPLE 1

(Test #258)

A copper concentrate from the Highland Valley Copper Mine in British Columbia was subjected to pressure oxidation and atmospheric leaching under the following conditions (batch):

| Pressure Oxidation | | Atmospheric Leach | |
|---|---|---|---|
| Temperature: | 150° C. | Temperature: | 40° C. |
| Retention Time: | 60 minutes | Time: | 60 minutes |
| Pressure: | 200 psig | pH: | 1.5–1.7 |
| Pressure Oxidation | | | |
| Concentrate wt.: | 225 g | % | (37.9 Cu, 21.4 Fe, 28.3 S) |
| Feed Solution: | 1100 mL | g/L | (26.1 Cu, 12.4 Cl, 24.8 $H_2SO_4$, 0 ppm Fe) |
| Filtrate: | 985 mL | g/L | (30.1 Cu, 12.2 Cl, 3.4 pH, 10 ppm Fe) |
| Atmospheric Leach | | | |
| Feed Solution | 3000 mL | g/L | (1.9 Cu, 0.8 Cl, 0.91, Fe) |
| Filtrate: | 3915 mL | g/L | (20.0 Cu, 0.9 Cl, 0.88 Fe, 1.9 pH) |
| Residue: | 154 g | % | (1.27 Cu, 29.5 Fe) |

The results are given in Table 1.

TABLE 1

| Cu % Distribution | | | % Cu | $H^+$ Cu | % Sulphur |
|---|---|---|---|---|---|
| Filtrate | Residue | Δ [$Cu^{2+}$] | Extraction | Molar | Oxidation |
| 0% | 100% | 0.9 | 97.7% | 0.41 | 9.1% |

In the present examples, all values of Δ[$Cu^{2+}$] were back-calculated to constant volume for feed solution and pressure oxidation filtrate. Acid was added to the atmospheric leach solution as required to produce a final pH as indicated. The percentage copper distribution shown in Table 1 refers to pressure oxidation.

It can be seen that the pressure oxidation filtrate contained almost no additional copper beyond that in the feed solution. All the copper from the feed concentrate was present in the basic copper salt. Only 9.1% sulphur oxidation occurred and the overall copper recovery after atmospheric leaching was 97.3%. Sulphur oxidation was calculated by sulphate balance method.

EXAMPLES 2 and 3

(Test #263 and #265)

Two further tests were conducted under the same conditions as Example 1 above, except that the acid in the pressure oxidation feed solution was zero in Example 2 and 35 g/L in Example 3. The results of Examples 1 to 3 are compared in Table 2. The tests of Examples 1 to 3 were carried out in a batch-wise fashion in the autoclave.

TABLE 2

| Example | Acid in Feed (g/L) | Δ [Cu$^{2+}$] | % Cu Extraction | % Sulphur Oxidation |
|---|---|---|---|---|
| 2 | 0 | −14.7 | 97.1% | 13.8% |
| 1 | 25 | 0.9 | 97.7% | 9.1% |
| 3 | 35 | 9.9 | 97.4% | 7.9% |

It can be seen that the acidity of the pressure oxidation feed affects the sulphur oxidation. By increasing the acidity of the pressure oxidation feed from 0 to 35 g/L, the sulphur oxidation decreased from 14% to 8%. The acidity of the pressure oxidation feed also influences the change in copper concentration between the feed and the filtrate. Approximately 25 g/L acid is required to maintain an equilibrium copper tenor across the pressure oxidation. If the concentration of acid in the feed is above 25 g/L, there is a build-up of copper in the filtrate.

EXAMPLE 4

(Test #198)

Using the same concentrate as in the previous examples, a pressure oxidation test was conducted on a continuous basis in the autoclave instead of batchwise, under the following conditions:

| Pressure Oxidation | | Atmospheric Leach (on sample) | |
|---|---|---|---|
| Temperature: | 150° C. | Temperature: | 40° C. |
| Retention Time: | 149 minutes | pH: | 1.5–1.7 |
| Pressure: | 200 psig | | |
| No. Compartments: | 4 | | |
| Solids Dry Rate: | 4.0 kg/hr @ 69% Solids | | |
| Acid Feed Rate: | 12.4 L/hr | | |
| Solution Feed Temp: | 85° C. | | |
| Concentrate: | Highland Valley Copper | | |

A sample of the pressure oxidation product slurry was filtered and the filter cake was then batch leached under atmospheric leach conditions to determine the overall copper recovery.

| Pressure Oxidation | | |
|---|---|---|
| Concentrate wt.: | 49 kg | % (39.5 Cu, 16.85 Fe, 24.9 S) |
| Feed Solution: | 139 L | g/L (13.1 Cu, 11.7 Cl, 53.7 H$_2$SO$_4$, 286 ppm Fe) |
| Product Solution (est. volume) | 125 L | g/L (17.5 Cu, 3.1 pH, 10 ppm Fe) |
| Atmospheric Leach | | |
| Residue (est. weight): | 34 kg | % (1.3 Cu) |

The results are given in Table 3.

TABLE 3

| Cu % Distribution | | | % Cu | H$^+$ Cu |
|---|---|---|---|---|
| Filtrate | Residue | Δ [Cu$^{2+}$] | Extraction | Molar |
| 1% | 99% | 2.6 | 97.6% | 0.50 |

It can be seen that the copper from concentrate was largely present as the basic copper salt; only about 1% being present in the filtrate. The value of Δ[Cu$^{2+}$] was small and the overall copper extraction was 97.3%, after atmospheric leach. Sulphur oxidation was calculated at 6.6% based on sulphate balance between feed and product streams, illustrating how sulphur oxidation is minimized by use of high sulphate in feed solution.

EXAMPLE 5

(Test #206)

Another test similar to Example 4 was conducted, again on a continuous basis in the autoclave. This time the feed solution contained higher copper and less acid:

| Pressure Oxidation | | Atmospheric Leach | |
|---|---|---|---|
| Temperature: | 150° C. | Temperature: | 40° C. |
| Retention Time: | 149 minutes | pH: | 1.5–1.7 |
| Pressure: | 200 psig | | |
| Volume: | 34 L | | |
| No. Compartments: | 4 | | |
| Solids Dry Rate: | 4.0 kg/hr @ 69% Solids | | |
| Acid Feed Rate: | 12.4 L/hr | | |
| Solution Feed Temp: | 72° C. | | |
| Concentrate: | Highland Valley Copper | | |
| Pressure Oxidation | | | |
| Concentrate wt.: | 47 kg | % (40.1 Cu, 15.6 Fe, 24.9 S) | |
| Feed Solution: | 143 L | g/L (34.1 Cu, 12.1 Cl, 33.6 H$_2$SO$_4$, 16 ppm Fe) | |
| Product Solution (est. volume) | 129 L | g/L (12.4 Cu, 3.2 pH, 4 ppm Fe) | |

| Atmospheric Leach | | |
|---|---|---|
| Residue (est. weight): | 33 kg | % (1.47 Cu) |

TABLE 4

| Cu % Distribution | | | % Cu | H+ Cu | % Sulphur |
|---|---|---|---|---|---|
| Filtrate | Residue | Δ [Cu²⁺] | Extraction | Molar | Oxidation |
| −18.5% | 118.5% | −23 | 97.4% | 0.35 | 4.2% |

This example illustrates how the acid concentration in the feed solution can be reduced by adding copper into the feed solution, as well, i.e. 33.6 g/L $H_2SO_4$ as opposed to 53.7 g/L in the previous Example. Again the sulphur oxidation is very low because of high sulphate in the feed solutions.

The following tests were done on low grade concentrate, using Process Mode B to illustrate this embodiment of the invention. In this embodiment it is desired to leach the major portion of copper in concentrate into solution.

EXAMPLE 6

(Test #352)

A test was conducted on a batch-wise basis under the following conditions:

| Pressure Oxidation | | Atmospheric Leach | |
|---|---|---|---|
| Temperature: | 150° C. | Temperature: 40° C. | |
| Retention Time: | 60 minutes | Time: 60 minutes | |
| Pressure: | 200 psig | pH: 1.5–1.7 | |
| Pressure Oxidation | | | |
| Concentrate wt.: | 225 g | % (22.8 Cu, 25.3 Fe, 28.9 S) | |
| Feed Solution: | 1100 mL | g/L (13.6 Cu, 11.7 Cl, 34.0 $H_2SO_4$, 0 ppm Fe) | |
| Product Solution (est. volume) | 1035 mL | g/L (53.5 Cu, 10.9 Cl, 2.9 pH, 32 ppm Fe) | |
| Atmospheric Leach | | | |
| Filtrate: | 1420 mL | g/L (3.4 Cu, 0.7 Cl, 1.7 pH, 2.3 $H_2SO_4$, 0.62 Fe) | |
| Residue (est. weight): | 184 g | % (1.43 Cu, 27.6 Fe) | |

The results are shown in Table 5.

TABLE 5

| Cu % Distribution | | | % Cu | H+ Cu | % Sulphur |
|---|---|---|---|---|---|
| Filtrate | Residue | Δ [Cu²⁺] | Extraction | Molar | Oxidation |
| 79% | 21% | 35.0 | 95% | 0.95 | 13.5% |

In this case the major portion of the copper is in the filtrate. Sulphur oxidation was 13.5% and 95.0%. Cu extraction was obtained. An amount of 79% of copper reported to the filtrate due to the high $H^+/Cu$ ratio.

EXAMPLE 7

(Test #88)

A further test was conducted on the same low grade concentrate on a continuous basis in the autoclave under the following conditions:

| Pressure Oxidation | | Atmospheric Leach | |
|---|---|---|---|
| Temperature: | 150° C. | Temperature: 40° C. | |
| Retention Time: | 53 minutes | pH: 1.5–1.7 | |
| Pressure: | 200 psig | | |
| No. Compartments: | 5 | | |
| Solids Dry Rate: | 7.2 kg/hr @ 68% Solids | | |
| Acid Feed Rate: | 32.8 L/hr | | |
| Solution Feed Temp: | 45° C. | | |
| Concentrate: | Island Copper | | |
| Pressure Oxidation | | | |
| Concentrate wt.: | 55 kg | % (22.5 Cu, 25.4 Fe, 29.1 S) | |
| Feed Solution: | 250 L | g/L (9.4 Cu, 13.2 Cl, 35.0 $H_2SO_4$) | |
| Product Solution: (est. volume) | 225 L | g/L (50.8 Cu, 2.8 pH) | |
| Atmospheric Leach | | | |
| Residue: (est. weight) | 47 kg | % (1.4 Cu) | |

The results are given in Table 6.

TABLE 6

| Cu % Distribution | | | % Cu | H+ Cu | % Sulphur |
|---|---|---|---|---|---|
| Filtrate | Residue | Δ [Cu²⁺] | Extraction | Molar | Oxidation |
| 73% | 27% | 36.3 | 94.6% | 0.83 | 16.5% |

Again the major proportion of copper reported to the pressure oxidation filtrate due to high $H^+/Cu$ ratio.

EXAMPLES 8 and 9

These Examples illustrate the operation of the atmospheric leach and counter current washing in continuous fashion for Mode A and Mode B. The operating conditions for both Examples are as follows:

| OPERATING CONDITIONS | | |
|---|---|---|
| Parameter | Atmospheric Leach | Counter-Current Wash |
| Temperature | 40 to 45° C. | 32 to 25° C. |
| pH Final | 1.7 | 3.5 |
| Number of Reactors | 3 | 5 mix tanks, 5 columns |
| Total Volume of Three | 69 L | n/a |

-continued

| OPERATING CONDITIONS | | |
|---|---|---|
| Parameter | Atmospheric Leach | Counter-Current Wash |
| Reactors Retention Time | 45–60 minutes | n/a |

Example 8 illustrates the Mode A (FIG. 1) embodiment of the process where the copper is substantially completely contained in the pressure oxidation filter cake and Example 9 illustrates the Mode B (FIG. 2) embodiment where only a minor portion of the copper is contained in the filter cake. The results are given in Tables 7 and 8, respectively. In Example 8 the overall Cu extraction was 97.5% and in Example 9, 94.6%.

TABLE 7

EXAMPLE OF PROCESS MODE A - STREAM COMPOSITION and VOLUMES/WEIGHTS

| STREAM | Volume (L) or Weight (kg) | % Solids | [Cu] g/L | [Free Acid] g/L | [Cl] g/L | [Fe] g/L |
|---|---|---|---|---|---|---|
| Primary Raffinate 120 | 1225 L | 0.0 | 0.5 | 26 | 1.1 | 0.3 |
| Spent Electrolyte Bleed Extraction | 5.8 L | 0.0 | 35.2 | 204 | — | — |
| P.O. Filter Cake | 155 kg wet | 81 | 23% | n/a | n/a | n/a |
| Atmospheric Leach Over Flow 31 | 1390 L | 4 | 18 | pH 1.64 | 1.2 | 0.3 |
| Flocculant | 70 L | 1.0 g/L | n/a | n/a | n/a | n/a |
| Coagulant | 36 L | 1.0 g/L | n/a | n/a | n/a | n/a |
| Wash Water to CCW 51 | 800 L | 0.0 | — | pH 3.6 | 1.0 | — |
| CCW #5 Under Flow 35 | 228 kg | 41 | 1.7% 0.17 g/L | pH filtrate 3.1 | 1.1 | 0.05 |
| Tap Water PLS Dilution | 360 L | 0.0 | — | pH 5 | — | — |
| Filtrate to solvent 33 extraction | 2370 L | filtered out | 11 | pH 1.9 | 1.1 | 0.3 |

TABLE 8

EXAMPLE OF PROCESS MODE B - STREAM COMPOSITION AND VOLUMES/WEIGHTS

| STREAM | Volume (L) or Weight (kg) | % Solids | [Cu] g/L | $H_2SO_4$ g/L | [Cl] g/L | [Fe] g/L |
|---|---|---|---|---|---|---|
| Primary Raffinate 120 | 300 L | 0.0 | 0.0 | 11 | 1.0 | 0.3 |
| Spent Electrolyte Bleed Extraction | 10.2 L | 0.0 | 30 | 180 | 12 ppm | 0.1 |
| P.O. Filter Cake | 154 kg Wet | 75 | 3.9% | n/a | n/a | n/a |
| Atmospheric Leach Over Flow 31 | 440 L | 27 | 7.5 | 1.3 | 1.3 | n/a |
| Flocculant | 51 L | 1.0 g/L | n/a | n/a | n/a | n/a |
| Coagulant | 41 L | 1.0 g/L | n/a | n/a | n/a | n/a |
| Wash Water to CCW 51 | 628 L | 0.0 | 0.1 | pH 3.0 | 0.9 | 0.3 |
| CCW #5 Under Flow 35 | 216 kg | 39 | 1.3% 0.12 g/L | pH filtrate 2.9 | 0.9 | 0.03 |

TABLE 8-continued

EXAMPLE OF PROCESS MODE B - STREAM COMPOSITION AND VOLUMES/WEIGHTS

| STREAM | Volume (L) or Weight (kg) | % Solids | [Cu] g/L | $H_2SO_4$ g/L | [Cl] g/L | [Fe] g/L |
|---|---|---|---|---|---|---|
| Tap Water PLS Dilution | 0 L | 0.0 | — | — | — | — |
| Filtrate to solvent extraction 33 | 980 L | n/a | 4.1 | 1.2 | 0.8 | 0.4 |

EXAMPLES 10 and 11

These examples illustrate the solvent extraction stages of the process. In Example 10, the process is according to the FIG. 1 embodiment and in Example 11 it is according to the FIG. 2 embodiment. In both instances, the operating parameters are as follows:

| | |
|---|---|
| Mixer Retention Time: | 3 to 6 minutes |
| Temperature: | 40 to 45° C. |
| Copper Organic Extractant: | 40% v/v LIX @ 70:30 v/v 860n:84N |
| Organic Diluent: | 60% v/v ORFOM SX-11 |

The results are given in Tables 9 and 10. The reference numerals indentifying the different streams are shown in FIGS. 1 and 2, respectively.

TABLE 9

| Stream | Volume (basis: 24 Hours) L | [Cu] g/L | $H_2SO_4$ g/L | [Cl] ppm | Copper Losses to the Final Raffinate |
|---|---|---|---|---|---|
| Product solution 33 | 3168 | 11.5 | 1.5 | 1050 | |
| Raffinate 120 (to atmospheric leaching) | 2112 | 0.5 | 18 | 1050 | |
| Raffinate 121 (to neutralization) | 1056 | 0.5 | 18 | 1050 | |
| Filtrate 39 | 1056 | 0.5 | pH 2 | 1050 | |
| Secondary raffinate 43 | 1056 | 0.05 | 1.7 | 1050 | |
| Solution 51 | 1056 | 0.004 | pH 9 | 1050 | 0.1% |
| Wash Water 122 | 43 | 0 | pH 1.3 | 0 | |
| Wash product 47 | 43 | 0.45 | 6.2 | 220 | |
| Primary loaded extractant 123 | 3168 | 17 | | | |
| Secondary loaded extractant 124 | 3168 | 6.35 | | | |
| Stripped extractant 125 | 3168 | 6.2 | | | |
| Spent Electrolyte 55 | 3168 | 41 | 200 | 20 | |
| Pregnant Electrolyte 57 | 3168 | 30 | 184 | 20 | |

In Example 11 about two-thirds of the stripped extractant 125 bypassed the solvent extraction 16 and was fed directly to the first stage of the solvent extraction 50, which has two stages. Only one-third of the stripped extractant 125 was fed to the solvent extraction 16, producing a primary loaded extractant which was introduced into the second stage of the solvent extraction 50 to join the streams from the solvent extractions 16 and 50 into the combined loaded extractant 65.

TABLE 10

| Stream | Volume (basis: 24 Hours) L | [Cu] g/L | $H_2SO_4$ g/L | [Cl] **g/L ppm | Copper Extraction |
|---|---|---|---|---|---|
| Product solution 33 | 1152 | 4.1 | pH 1.9 | **0.89 | |
| Raffinate 120 (to atmospheric leaching) | 768 | 0.08 | 9.3 | — | |
| Raffinate 121 (to neutralization) | 384 | 0.08 | 9.3 | — | |
| Solution 51 | 384 | 0 | pH 9 | — | 0.7% |
| Pressure oxidation filtrate 29 | 778 | 49.9 | pH 3.2 | **11.36 | |
| Raffinate 63 | 778 | 12.9 | 56.5 | — | 0.1% |
| Filtrate 82 | n/a | 12.9 | pH 2 | — | |
| Wash Water 122 | 43 | 0 | pH 1.3 | 0 | |
| Wash Product 47 | 43 | 8.7 | 21.5 | 4.9 | |
| Loaded extractant 126 | 1152 | 10.3 | | | |
| Loaded extractant 65 | 3168 | 18.2 | | | |
| Stripped extractant 125 | 3168 | 6.07 | | | |
| Spent Electrolyte 55 | 3168 | 28.5 | 184 | 21 | |
| Pregnant Electrolyte 57 | 3168 | 40.8 | 167 | 23 | |

While only preferred embodiments of the invention have been described herein in detail, the invention is not limited thereby and modifications can be made within the scope of the attached claims.

What is claimed is:

1. A process for the extraction of copper from a sulphide copper ore or concentrate, comprising the steps of:
   subjecting the ore or concentrate to pressure oxidation in the presence of oxygen and an acidic chloride solution to obtain a resulting pressure oxidation filtrate and an insoluble basic copper sulphate salt, characterized in that the pressure oxidation is conducted in the presence of a source of bisulphate or sulphate ions which is selected from the group consisting of sulphuric acid and a metal sulphate which hydrolyzes in the acidic solution and wherein the amount of the source of bisulphate or sulphate ions which is added contains at least the stoichiometric amount of sulphate or bisulphate ions required to produce the basic copper sulphate salt less the amount of sulphate generated in situ in the pressure oxidation.

2. A process according to claim 1, further comprising the steps of:

recycling the pressure oxidation filtrate to the pressure oxidation;

leaching the basic copper sulphate salt produced by the pressure oxidation in a second leaching with an acidic sulphate solution to dissolve the basic copper salt to produce a leach liquor containing copper sulphate in solution and a resulting solid residue;

separating the leach liquor from the solid residue;

subjecting the leach liquor to a solvent extraction process to produce copper concentrate solution and a raffinate; and recycling the raffinate to the second leaching step.

3. A process according to claim 2, wherein the pressure oxidation is carried out at a predetermined molar ratio of $H^+/Cu$, where $H^+$ represents the hydrogen ions in the acidic chloride solution and Cu represents the copper in the ore or concentrate, so that the copper concentration in the resulting pressure oxidation filtrate from the pressure oxidation is substantially equal to the copper concentration in the pressure oxidation filtrate which is recycled to the pressure oxidation step.

4. A process according to claim 3, wherein the chloride concentration in the pressure oxidation filtrate, which is recycled to the pressure oxidation step, is maintained at a value of from about 8 g/L to about 20 g/L.

5. A process according to claim 4, wherein the chloride concentration is maintained in the range of from about 11 g/L to about 14 g/L.

6. A process according to claim 5, wherein the chloride concentration is maintained at about 12 g/L.

7. A process according to claim 2, wherein the pressure oxidation is carried out at a predetermined molar rate of $H^+/Cu$, where $H^+$ represents the hydrogen ions in the acidic chloride solution and Cu represents the copper in the ore or concentrate, so that the copper concentration in the resulting pressure oxidation filtrate from the pressure is in the range of about 10 g/L to about 25 g/L.

8. A process according to claim 2, wherein the second leaching is effected at a pH in the range of from about 1.3 to about 2.2.

9. A process according to claim 8, wherein the second leaching is effected at a pH in the range of from about 1.6 to about 1.9.

10. A process according to claim 2, wherein the second leaching is effected at a temperature in the range of from about 20° C. to about 70° C.

11. A process according to claim 10, wherein the second leaching is effected at a temperature in the range of from about 35° C. to about 45° C.

12. A process according to claim 2, further comprising the step of subjecting the copper concentrate solution to electrowinning to recover copper therefrom.

13. A process according to claim 12, wherein the solvent extraction process to which the leach liquor from the second leaching is subjected, comprises mixing of the leach liquor with an organic extractant to produce a loaded extractant, washing the loaded extractant with water, and stripping the loaded extractant with a sulphuric acid solution to produce the copper concentrate solution for electrowinning.

14. A process according to claim 13, wherein the sulphuric acid solution comprises exhausted or spent electrolyte which is recycled from the electrowinning.

15. A process according to claim 2, wherein the raffinate is split into a first portion comprising about two-thirds of the raffinate and a second portion comprising about one-third of the raffinate and wherein the first portion is recycled to the second leaching and the second portion is subject to a secondary solvent extraction to remove copper to produce a secondary lixiviant and a secondary raffinate.

16. A process according to claim 15, wherein the secondary lixiviant is used as the organic extractant in the solvent extraction of the leach liquor from the second leaching.

17. A process according to claim 15, further comprising the step of subjecting the second portion to a first neutralization at a pH of about 1.5 to about 3, to neutralize acid content, prior to the secondary solvent extraction and subjecting the secondary raffinate to a secondary neutralization at a pH of about 9 to 10 to neutralize acid content and remove dissolved metals therefrom.

18. A process according to claim 17, wherein the separation of the leach liquor and the solid residue from the second leaching is carried out by means of a counter current decantation process and wherein the secondary raffinate, after the second neutralization, is recycled to serve as wash water in the counter current decantation process for washing the solid residue.

19. A process according to claim 1, wherein the pressure oxidation is carried out at a temperature of from about 115° C. to about 175° C.

20. A process according to claim 1, wherein the pressure oxidation is carried out at an elevated pressure comprising an oxygen partial pressure from about 50 psig (345 kPa) to about 250 psig (1725 kPa).

21. A process according to claim 1, wherein liquid elemental sulphur is formed during the pressure oxidation and further comprising the step of adding a surfactant to the pressure oxidation to minimize the viscosity of the liquid elemental sulphur during the pressure oxidation.

22. A process according to claim 1, wherein the pressure oxidation filtrate is recycled to the pressure oxidation to serve as the source of bisulphate or sulphate ions.

23. A process according to claim 22, further comprising the step of subjecting the pressure oxidation filtrate to solvent extraction to remove dissolved copper therefrom prior to recycling the filtrate to the pressure oxidation.

24. A process according to claim 1, wherein the source of bisulphate or sulphate ions comprises a sulphuric acid solution or a copper sulphate solution which is added from an external source.

25. A process according to claim 1, wherein the pressure oxidation is carried out at a predetermined molar ratio of $H^+/Cu$, where $H^+$ represents the hydrogen ions in the acidic chloride solution and Cu represents the copper in the ore or concentrate, so that the pressure oxidation filtrate contains a first portion of the copper in the ore or concentrate and the basic copper salt contains a second portion of the copper in the ore or concentrate and further comprising the steps of:

separating the pressure oxidation filtrate and the basic copper salt;

leaching the basic copper salt in a second leaching step with an acidic sulphate solution to dissolve the copper salt to produce a second copper solution and a solid residue; and subjecting the pressure oxidation filtrate and the second copper solution to solvent extraction to produce concentrated copper solution for electrowinning of copper therefrom.

26. The process as claimed in claim 25, wherein the solvent extraction comprises the steps of:
subjecting the second copper solution to solvent extraction with an organic extractant to form a first loaded extractant and a first raffinate;
subjecting the pressure oxidation filtrate to solvent extraction with the first loaded extractant to form a second loaded extractant and a second raffinate; and
stripping the copper from the second loaded extractant to produce a stripped extractant and a concentrated copper solution for electrowinning.

27. A process according to claim 26, wherein the second loaded extractant is subjected to washing with water, prior to stripping the copper from the second loaded extractant, to remove chloride therefrom.

28. A process according to claim 27, wherein the water from the washing of the second loaded extractant is recycled to wash the insoluble basic copper salt produced during pressure oxidation of the ore or concentrate.

29. A process according to claim 26, wherein the stripped extractant is recycled for effecting the solvent extraction of the second copper solution to produce the first loaded extractant and the first raffinate.

30. A process according to claim 26, further comprising the steps of recycling the second raffinate to the pressure oxidation step to serve as the acidic chloride solution.

31. A process according to claim 30, wherein the second raffinate is split into a first portion and a second portion prior to the recycling of the second raffinate and recycling the first portion of the raffinate, the relative amounts of the first and the second portions being determined by the molar ratio of $H^+/Cu$.

32. A process according to claim 31, further comprising the step of subjecting the second portion of the raffinate to neutralization to form a gypsum residue and a neutral solution, separating the residue and recycling the neutral solution to the pressure oxidation.

33. The method according to claim 26, further comprising the step of recycling the first raffinate to the second leaching step to serve as the acidic sulphate solution to effect the leaching.

34. A process according to claim 33, wherein the first raffinate is split into a major portion comprising about two-thirds of the raffinate and a minor portion comprising about one-third of the raffinate prior to the recycling of the first raffinate and recycling the first portion of the raffinate.

35. A process according to claim 34, further comprising the step of subjecting the second portion of the raffinate to neutralization to form a residue comprising gypsum and metal hydroscides.

36. A process according to claim 26, further comprising the steps of separating the residue resulting from the neutralization of the second portion of the first raffinate and recycling the resultant neutralized solution to serve as wash water in the counter current decantation process for washing the solid residue from the second leaching.

37. A process according to claim 26, wherein the ore or concentrate also contains nickel in addition to copper, and further comprising the steps of:
subjecting the first and second raffinates from the copper solvent extraction to nickel solvent extraction with an organic nickel extractant to produce respective first and second nickel-loaded extractants and respective first and second nickel extraction raffinates; and
stripping nickel from the first and second nickel-loaded extractants to produce concentrated nickel solution for electrowinning.

38. A process according to claim 37, wherein the second raffinate from the copper solvent extraction is subjected to the nickel solvent extraction with the first nickel-loaded extractant to produce the second nickel-loaded extractant, and further comprising the steps of:
stripping the nickel from the second nickel-loaded extractant to produce a stripped nickel extractant; and
recycling the stripped nickel extractant to effect the nickel solvent extraction of the first raffinate from the copper solvent extraction.

39. A process according to claim 25, wherein the second copper solution and the solid residue from the second leaching are separated by means of a counter current decantation process.

40. A process according to claim 25, further comprising the step of subjecting the pressure oxidation filtrate and the second copper solution to solvent extraction to extract zinc from the solutions.

41. A process according to claim 25, further comprising the step of subjecting the pressure oxidation filtrate and the second copper solution to solvent extraction to extract nickel from the solutions.

42. A process according to claim 25, wherein the predetermined molar ratio of $H^+/Cu$ is selected according to the grade of the ore or concentrate; the value of the ratio being selected with increasing magnitude with decreasing grade of the ore or concentrate.

43. A process according to claim 42, wherein the grade of the ore or concentrate is in the range of from about 28% to about 22% copper by weight and the molar ratio of $H^+/Cu$ ranges from about 0.7 to about 1.0.

44. A process according to claim 25, wherein the ore or concentrate also contains zinc along with copper, and further comprising the steps of:
subjecting the second copper solution and the pressure oxidation filtrate to zinc solvent extraction, prior to the solvent extraction of copper, with an organic zinc extractant to produce respective first and second zinc-loaded extractants and respective first and second zinc extraction raffinates;
subjecting the first zinc extraction raffinate to solvent extraction with an organic copper extractant to produce a first copper-loaded extractant and a first copper extraction raffinate;
subjecting the second zinc extraction raffinate to solvent extraction with the first copper-loaded extractant to form a second copper-loaded extractant and a second copper extraction raffinate; and
stripping the zinc from the first and second zinc-loaded extractants to produce concentrated zinc solution for electrowinning.

45. A process according to claim 44, wherein, prior to subjecting the second zinc extraction raffinate to solvent extraction, the second zinc extraction raffinate is subjected to one or more stages of neutralization to form a respective neutralized solution and a respective gypsom residue;
separating the respective neutralized solution from the respective gypsom residue after each stage to obtain a final neutralized solution;
subjecting the final neutralized solution to a further zinc solvent extraction to form a resultant zinc raffinate; and
subjecting the resultant zinc raffinate to the solvent extraction with the first copper-loaded extractant.

46. A process according to claim 44, wherein the pressure oxidation filtrate is subjected to the zinc solvent extraction with the first zinc-loaded extractant to produce the second zinc-loaded extractant, and further comprising the steps of:

stripping the zinc from the second zinc-loaded extractant to produce a stripped zinc extractant; and recycling the stripped zinc extractant to effect the zinc solvent extraction of the second copper solution.

47. A process according to claim 44, wherein the second zinc-loaded extractant also contains a minor loading of copper in addition to the zinc and further comprising the step of treating the second zinc-loaded extractant with an aqueous zinc sulphate solution in a counter current fashion to replace the minor loading of copper in the extractant with zinc for producing a substantially uncontaminated zinc solution for electrowinning, said treatment occurring in a plurality of successive stages.

48. A process for the extraction of copper from a sulphide copper ore or concentrate, comprising the steps of:

leaching the ore or concentrate in a first leaching step with an acidic chloride solution to produce a first copper solution and an insoluble basic copper salt;

separating the first copper solution and the basic copper salt;

leaching the basic copper salt in a second leaching step with an acidic sulphate solution to dissolve the copper salt to produce a second copper solution and a solid residue; and subjecting the first and second copper solutions to solvent extraction with an organic extractant to produce concentrated copper solution for electrowinning of copper therefrom.

49. The process as claimed in claim 48, wherein the solvent extraction comprises the steps of:

subjecting the second copper solution to solvent extraction with the extractant to form a first loaded extractant solution and a first raffinate;

subjecting the first copper solution to solvent extraction with the first loaded extractant solution to form a second loaded extractant solution and a second raffinate; and stripping the copper from the second loaded extractant to produce a stripped extractant and a concentrated copper solution for electrowinning.

50. The process according to claim 49, wherein the stripped extractant is recycled for effecting solvent extraction of the second copper solution to produce the first loaded extractant solution and the first raffinate.

51. The process according to claim 49, further comprising the step of recycling the second raffinate to the first leaching step to serve the acidic chloride solution to effect the leaching.

* * * * *